(12) United States Patent
Oi et al.

(10) Patent No.: US 6,423,807 B1
(45) Date of Patent: Jul. 23, 2002

(54) COPOLYMER, PROCESS FOR PRODUCING THE SAME, AND MOLDED ARTICLE COMPRISING THE SAME

(75) Inventors: Nobuo Oi, Narashino; Tatsuya Miyatake, Ichihara, both of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/485,127

(22) PCT Filed: Jun. 1, 1999

(86) PCT No.: PCT/JP99/02900

§ 371 (c)(1),
(2), (4) Date: Mar. 3, 2000

(87) PCT Pub. No.: WO99/64486

PCT Pub. Date: Dec. 16, 1999

(30) Foreign Application Priority Data

| Jun. 5, 1998 | (JP) | ............................................. | 10-158061 |
| Jun. 5, 1998 | (JP) | ............................................. | 10-158062 |
| Sep. 16, 1998 | (JP) | ............................................. | 10-261760 |
| Sep. 16, 1998 | (JP) | ............................................. | 10-261761 |

(51) Int. Cl.[7] ............................ C08F 212/08; C08F 4/44
(52) U.S. Cl. ...................... 526/347; 526/160; 526/161; 526/171; 526/943; 502/155
(58) Field of Search .............................. 526/347, 348.6, 526/160, 943, 161, 171; 502/155

(56) References Cited

U.S. PATENT DOCUMENTS

| 5,703,187 A | 12/1997 | Timmers |
| 5,747,613 A | 5/1998 | Takeuchi et al. |
| 5,883,213 A | 3/1999 | Arai et al. |

FOREIGN PATENT DOCUMENTS

| EP | 0405446 A2 | 1/1991 |
| EP | 0 764 653 A2 | * 3/1997 |
| EP | 764664 A2 | 3/1997 |
| EP | 0 842 93 A1 | 5/1998 |
| EP | 0 842 939 A1 | * 5/1998 |
| EP | 0896983 A1 | 2/1999 |
| EP | 0906932 A2 | 4/1999 |
| EP | 0985689 A1 | 3/2000 |
| JP | A 03-163088 | 7/1991 |
| JP | 9309925 A | 12/1997 |
| JP | 1060051 | 3/1998 |
| WO | WO-98/09999 | * 3/1998 |

* cited by examiner

*Primary Examiner*—David W. Wu
*Assistant Examiner*—R. Harlan
(74) *Attorney, Agent, or Firm*—Birch, Stewart, Kolasch & Birch, LLP

(57) ABSTRACT

A copolymer of ethylene with an alkenyl aromatic hydrocarbon having a content of the alkenyl aromatic hydrocarbon in the copolymer of 0.2 to 60 mol % and a ratio (②/③) of the area of a peak ② appearing at 34.0 to 36.0 ppm to the area of a peak ③ appearing at 36.0 to 38.0 ppm in a $^{13}$C-NMR spectrum of the copolymer of 0.01 to 0.35, and a molded article comprising the copolymer.

25 Claims, 6 Drawing Sheets

COPOLYMER, PROCESS FOR PRODUCING THE SAME, AND MOLDED ARTICLE COMPRISING THE SAME

This application is the national phase under 35 U.S.C. §371 of PCT International Application No. PCT/JP99/02900 which has an International filing date of Jun. 1, 1999, which designated the United States of America.

TECHNICAL FIELD

The present invention relates to a copolymer suitable for a molded article, particularly a sheet and a film, a process for producing the same, and a molded article comprising the same.

BACKGROUND ARTS

There have been recently realized progresses such that a polymer having a characteristic different from conventional polymers can be produced according to the appearance of a catalyst using a transition metal compound such as a so-called metallocene or non-metallocene, or the like, and a large quantity of polymer can be produced with an extremely small amount of catalyst.

The application of such catalyst is proposed in the copolymerization of ethylene with an alkenyl aromatic hydrocarbon represented by styrene. For example, a process for producing a quasi-random copolymer of ethylene with styrene (a random copolymer characterized in that methine carbon atoms bonded with a phenyl group are mutually separated by two methylene groups or more) with a so-called homogeneous Ziegler-Natta catalyst using a specified transition metal compound and an organoaluminum compound, is described in Japanese Patent Publication (Kokai) Hei No.3-163088. However, according to these processes, the activity is substantially low in the production of a copolymer having a high styrene content, and a syndiotactic polystyrene is occasionally produced as a by-product, therefore the process cannot be said as an efficient production process.

A process of producing a copolymer using a specified transition metal compound and an organoaluminum compound as a catalyst is reported in Japanese Patent Publication (Kokai) Hei No.9-309925. Said copolymer is a crystalline polymer having a high isotacticity of styrene configuration and occasionally inferior in transparency.

In general, elastic recoverability, delay recoverability, transparency and mechanical strength found in a polyvinyl chloride are required for a copolymer used as a wrap film. However, the polyvinyl chloride comes in question concerning environmental pollution in which the generation of harmful substances during combustion is possible, or the like. Various kind of polymers are presently considered as a replace of the polyvinyl chloride, but it is a status quo that none of them to be satisfied is obtained.

DISCLOSURE OF THE INVENTION

The present invention was achieved in view of the above-mentioned situations. Namely, the objects of the present invention is to provide a copolymer of ethylene with an alkenyl aromatic hydrocarbon, being capable of taking a constitution in which halogen pointed out as a cause for environmental pollution is not contained, and being excellent in elastic recoverability, delay recoverability and vibration suppression performance; a process for producing said copolymer at an extremely high polymerization activity; and a molded article which comprises said copolymer.

In order to attain the above-mentioned objects, the present inventors have intensively studied a copolymer of ethylene with an alkenyl aromatic hydrocarbon which is based on a production process using a transition metal compound represented by a metallocene as a catalyst component, and completed the present invention.

Namely, the present invention relates to a copolymer of ethylene with an alkenyl aromatic hydrocarbon wherein the content of the alkenyl aromatic hydrocarbon in the copolymer is 0.2 to 60 mol % and the ratio (②/③) of the area of a peak ② appearing at 34.0 to 36.0 ppm in a $^{13}$C-NMR spectrum of the copolymer to the area of a peak ③ appearing at 36.0 to 38.0 ppm is 0.01 to 0.35 and a molded article comprising said copolymer.

And, it relates to a copolymer has a structure in which carbon atoms substituted with an aromatic hydrocarbon group are mutually separated with one methylene group, a structure in which they are separated with two methylene groups, and a structure in which they are separated with at least three methylene groups, in the backbone (main chain) of the copolymer in the copolymer described above and a molded article comprising said copolymer.

Further, the present invention relates to a process for producing the copolymer described above, and a process for producing the copolymer which comprises copolymerizing ethylene with an alkenyl aromatic hydrocarbon in the presence of a catalyst prepared by using (A), and [(B) and/or (C)] described below:

(A) a transition metal complex represented by the following general formula [I]:

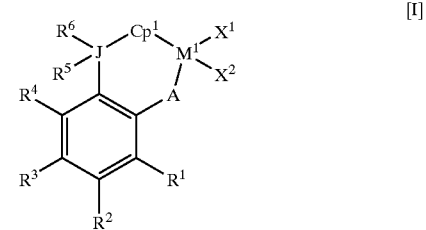

[I]

(wherein $M^1$ indicates a transition metal atom of the Group IV of the Periodic Table of the Elements; A indicates an atom of the Group XVI of the Periodic Table of the Elements; J indicates an atom of the Group XIV of the Periodic Table of the Elements; $Cp^1$ indicates a group having a cyclopentadiene type anion skeleton; each of $X^1$, $X^2$, $R^1$, $R^2$, $R^3$, $R^4$, $R^5$ and $R^6$ independently indicates a hydrogen atom, a halogen atom, an alkyl group, an aralkyl group, an aryl group, a substituted silyl group, an alkoxy group, an aralkyloxy group, an aryloxy group or a di-substituted amino group; and $R^1$, $R^2$, $R^3$, $R^4$, $R^5$ and $R^6$ may be optionally combined with each other to form a ring);

(B) one or more aluminum compounds selected from the following (B1) to (B3);

(B1) an organoaluminum compound represented by the general formula $E^1{}_a AlZ_{3-a}$, (B2) a cyclic aluminoxane having a structure represented by the general formula $\{-Al(E^2)-O-\}_b$, and (B3) a linear aluminoxane having a structure represented by the general formula $E^3\{-Al(E^3)-O-\}_c AlE^3{}_2$ (wherein $E^1$, $E^2$ and $E^3$ respectively represent a hydrocarbon group, all of $E^1$, all of $E^2$ and all of $E^3$ may be the same or different; Z represents a hydrogen atom or a halogen atom, and all of Z may be the same or different; "a" represents a number satisfying the expression $0 < a \leq 3$; "b" represents an integer of 2 or more and "c" represents an integer of 1 or more); and (C): a boron compound of any one of the following (C1) to (C3);

(C1) a boron compound represented by the general formula $BQ^1Q^2Q^3$, (C2) a boron compound represented by the general formula $G^+(BQ^1Q^2Q^3Q^4)^-$, and (C3) a boron compound represented by the general formula $(L-H)^+(BQ^1Q^2Q^3Q^4)^-$ (wherein B represents a boron atom in the trivalent valence state; $Q^1$ to $Q^4$ may be the same or different and respectively represent a halogen atom, a hydrocarbon group, a halogenated hydrocarbon group, a substituted silyl group, an alkoxy group or a di-substituted amino group; $G^+$ represents an inorganic or organic cation; L represents a neutral Lewis base; and $(L-H)^+$ represents a Brønsted acid).

BEST MODE FOR PRACTICING THE INVENTION

Figure 1:
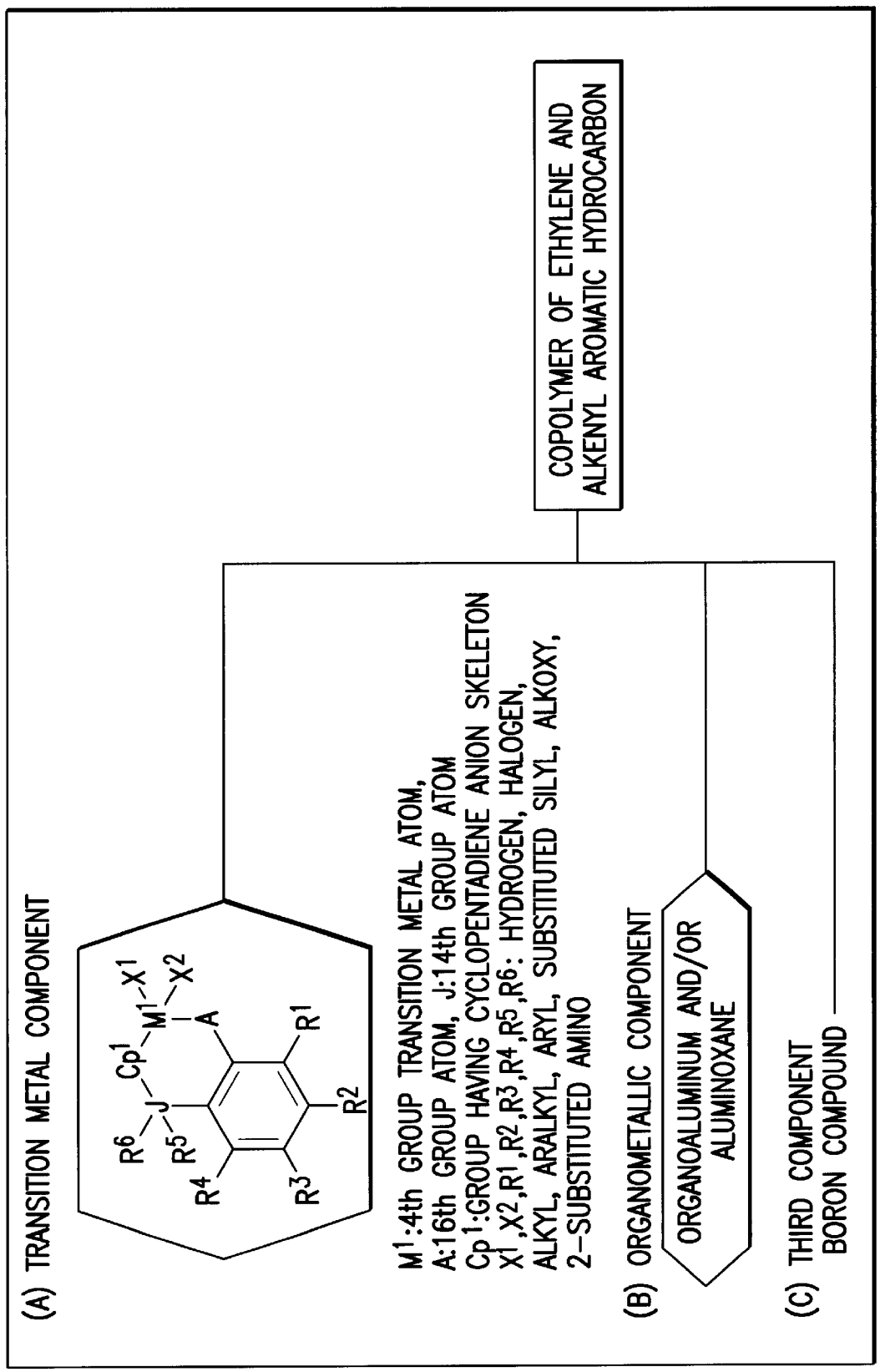
FIG. 1 shows a flow chart drawing for help of the understanding of the present invention. The present flow chart drawing is a typical example of the mode of the present invention, and the present invention is not restricted thereto.

The present invention is illustrated in detail below.

The copolymer of the present invention is a copolymer of ethylene with an alkenyl aromatic hydrocarbon having a content of the alkenyl aromatic hydrocarbon in the copolymer of 0.2 to 60 mol % and a ratio (②/③) of the area of a peak ② appearing at 34.0 to 36.0 ppm in a $^{13}C$-NMR spectrum of the copolymer to the area of a peak ③ appearing at 36.0 to 38.0 ppm of 0.01 to 0.35.

Herein, as the alkenyl aromatic hydrocarbon, an alkenyl compound having an aromatic hydrocarbon group having 6 to 25 carbon atoms is preferable. Specific examples of the aromatic hydrocarbon group having 6 to 25 carbon atoms include a phenyl group, a tolyl group, a xylyl group, a tert-butylphenyl group, a vinylphenyl group, a naphthyl group, a phenanthryl group, an anthrathenyl group and the like. A phenyl group, a tolyl group, a xylyl group, a tert-butylphenyl group, a vinylphenyl group or a naphthyl group is preferable.

Specific examples of such alkenyl aromatic hydrocarbon include alkylstyrenes such as styrene, p-methylstyrene, m-methylstyrene, o-methylstyrene, p-ethylstyrene, m-ethylstyrene, o-ethylstyrene, 2,4-dimethylstyrene, 2,5-dimethylstyrene, 3,4-dimethylstyrene, 3,5-dimethylstyrene, 3-methyl-5-ethylstyrene, p-tert-butylstyrene, p-sec-butylstyrene and the like; alkenylbenzenes such as 2-phenylpropylene, 2-phenylbutene and the like; vinylnaphthalenes such as 1-vinylnaphthalene and the like, etc. As the alkenyl aromatic hydrocarbon used in the present invention, styrene, p-methylstyrene, m-methylstyrene, o-methylstyrene, p-tert-butylstyrene, 2-phenylpropylene or 1-vinylnaphthalene is preferable and styrene is preferable in particular.

In the copolymer of the present invention, the content of the alkenyl aromatic hydrocarbon in the copolymer is 0.2 to 60 mol %. The content of the alkenyl aromatic hydrocarbon in the copolymer is preferably 10 to 55 mol %. The content in the copolymer can be easily determined by a $^{13}C$-NMR spectrum using o-dichlorobenzene as a solvent.

The copolymer of the present invention is a copolymer having a ratio ((②/③)) of the area of a peak ② appearing at 34.0 to 36.0 ppm in a $^{13}C$-NMR spectrum of the copolymer to the area of a peak ③ appearing at 36.0 to 38.0 ppm of 0.01 to 0.35, preferably 0.01 to 0.25, more preferably 0.01 to 0.20.

In the $^{13}C$-NMR spectrum, a peak based on a methylene group indicated by $S_{\alpha\gamma}$ and $S_{\alpha\delta}$ in the general formula (1) described below appears usually at 36.0 to 38.0 ppm (③). The existence of said methylene group represents that an alkenyl aromatic hydrocarbon unit is sandwiched by ethylene units and a structure in which there is no sequence of the alkenyl aromatic hydrocarbons exists. Further, when such bond occurs, carbon atoms substituted with an aromatic hydrocarbon group are mutually separated by 3 methylene groups or more.

Further, a peak based on a methylene group indicated by $S_{\alpha\beta}$ in the general formula (2) described below appears usually at 34.0 to 36.0 ppm (②). Such methylene group exists when the alkenyl aromatic hydrocarbon unit is bonded to an inverse direction in the molecular chains of the copolymer. In other words, said methylene group exists when the insertion form of the alkenyl aromatic hydrocarbon takes 2,1-insertion of the alkenyl aromatic hydrocarbon successively after 1,2-insertion, or takes 1,2-insertion through the insertion of ethylene after 2,1-insertion. Further, when such bond occurs, carbon atoms substituted with an aromatic hydrocarbon group are mutually separated by 2 methylene groups.

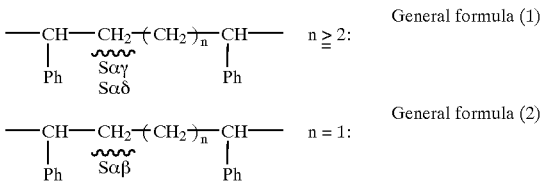

General formula (1)

General formula (2)

Further, a case in which styrene was used as the alkenyl aromatic hydrocarbon is illustrated in the general formulae (1) and (2).

The copolymer having a ratio ((②/③)) of the area of a peak ② appearing at 34.0 to 36.0 ppm in a $^{13}C$-NMR spectrum of the copolymer to the area of a peak ③ appearing at 36.0 to 38.0 ppm of 0.01 to 0.35, has few ethylene sequences or few sequences of the alkenyl aromatic hydrocarbon, and it can be said that the alternating tendency of the insertion of ethylene and the alkenyl aromatic hydrocarbon is high. And, such polymer is good in balance of viscoelasticity. Herein, the balance of viscoelasticity means a balance between a storage modulus(E') and a loss modulus (E") which can be determined by a solid dynamic viscoelasticity test, and when the storage modulus lowers, the loss modulus(E") usually tends to lower. On the other hand, a copolymer having a high alternating property of insertion of ethylene and the alkenyl aromatic hydrocarbon has a low storage modulus, namely, although it has a flexibility, the loss modulus is high, that is, it is low in restitution property and excellent in delay recoverability and vibration suppression performance.

Preferably, the copolymer has a structure in which carbon atoms substituted with an aromatic hydrocarbon group mutually separated by one methylene group, a structure in which carbon atoms substituted with an aromatic hydrocarbon group mutually separated by two methylene groups, and a structure in which carbon atoms substituted with an aromatic hydrocarbon group mutually separated three or more of methylene groups. In this case, it has alkenyl aromatic hydrocarbon sequences in which alkenyl aromatic hydrocarbon units are bonded to the same direction, so-called head to tail. When such alkenyl aromatic hydrocarbon sequences exist, a signal of $^{13}$C-NMR spectrum corresponding to the carbon atom ($T_{\beta\delta}$) substituted with the aromatic hydrocarbon is usually observed at near 44.0 ppm. In this case, the content of the alkenyl aromatic hydrocarbon in the copolymer is more preferably 35 to 55 mol %, and the particularly preferable content of the alkenyl aromatic hydrocarbon in the copolymer is 47 to 55 mol %.

Further, when the signal of $^{13}$C-NMR spectrum described above is not observed at near 44.0 ppm in the copolymer of the present invention, the content of the alkenyl aromatic hydrocarbon in the copolymer is preferably 15 mol % or more and less than 47 mol % and the particularly preferable content of the alkenyl aromatic hydrocarbon in the copolymer is 30 mol % or more and less than 47 mol %. When the content in the copolymer is within this range, it is particularly preferable because of excellent in flexibility.

The copolymer of the present invention preferably satisfies the expression (a') in the relation of the content of the alkenyl aromatic hydrocarbon in the copolymer S (mol %) with the maximum value X of loss tangent(tan δ) of the copolymer:

$$X > -0.0005 \times S^2 + 0.06 \times S + 0.04 \quad (a')$$

Wherein tan δ indicates a ratio(E"/E') of a loss modulus(E") to a storage modulus(E') obtained by measuring a solid viscoelasticity of a press sheet of 20 mm×3.0 mm×0.3 mm in size under the conditions of 5 Hz of frequency, 2° C./minute of heating rate and 10 μm of width of displacement amplitude. A copolymer satisfying the expression(a') is excellent in delay recoverability, does not exhibit an instantaneous restoration behavior, and therefore is preferably suitable as a wrap film. And, when the maximum value X of tan δ is high, the copolymer of the present invention is also excellent in vibration suppression performance. As the copolymer of ethylene and an alkenyl aromatic hydrocarbon of the present invention, a more preferable copolymer satisfies the expression (b') in the copolymerized composition S (mol %) of the alkenyl aromatic hydrocarbon and the maximum value of loss tangent(tan δ), and particularly preferably satisfies the following expression(c'), most preferably satisfies has a loss tangent(tan δ) of 1.9 or more.

$$X > -0.0005 \times S^2 + 0.06 \times S + 0.17 \quad (b')$$

$$X > -0.0005 \times S^2 + 0.05 \times S + 0.44 \quad (c')$$

The copolymer of ethylene and an alkenyl aromatic hydrocarbon of the present invention is preferably a non-crystalline copolymer substantially having no crystallinity from viewpoint of transparency. It can be confirmed by no substantial indication of a melting point in a DSC melting curve that the copolymer has substantially no crystallinity.

Further, as the copolymer of the present invention, a copolymer having a Tg of −20 to 40° C. is preferable.

As the copolymer of ethylene and an alkenyl aromatic hydrocarbon of the present invention, a copolymer substantially having no stereoregularity of the alkenyl aromatic hydrocarbon unit is preferable. When the alkenyl aromatic hydrocarbon unit has a stereoregularity, the copolymer easily form a crystalline structure and has a possibility of decrease in transparency. It can be confirmed by a $^{13}$C-NMR spectrum that the copolymer, substantially not to have a stereoregularity of the alkenyl aromatic hydrocarbon unit.

As the copolymer of the present invention, the molecular weight distribution (Mw/Mn) represented by the ratio of weight average molecular weight (Mw) to number average molecular weight (Mn) is preferably 1.5 to 4.0 from viewpoints of mechanical strength and transparency, more preferably 1.5 to 3.5, and preferably 1.5 to 3.0 in particular.

Further, as the copolymer of the present invention, the number average molecular weight (Mn) is preferably 10000 to 1000000 from the viewpoint of mechanical strength, more preferably 50000 to 300000, and preferably 100000 to 250000 in particular.

The copolymer of the present invention can be produced at high polymerization activity, for example, by copolymerizing ethylene with the alkenyl aromatic hydrocarbon in the presence of a catalyst prepared by using (A) and [(B) and/or (C)] described below:

(A): a transition metal complex represented by the following general formula [I]:

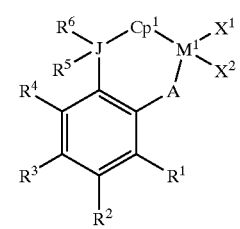

[I]

(wherein M$^1$ represents a transition metal atom of Group IV of the Periodic Table of the Elements; A represents an atom of the Group XVI of the Periodic Table of the Elements; J represents an atom of the Group XIV of the Periodic Table of the Elements; Cp$^1$ represents a group having a cyclopentadiene type anion skeleton; X$^1$, X$^2$, R$^1$, R$^2$, R$^3$, R$^4$, R$^5$ and R$^6$ independently represent a hydrogen atom, a halogen atom, an alkyl group, an aralkyl group, an aryl group, a substituted silyl group, an alkoxy group, an aralkyloxy group, an aryloxy group or a di-substituted amino group; and R$^1$, R$^2$, R$^3$, R$^4$, R$^5$ and R$^6$ may be optionally combined with each other to form a ring);

(B): at least one aluminum compound selected from the following (B1) to (B3);

(B1) an organoaluminum compound represented by the general formula E$^1_a$AlZ$_{3-a}$, (B2) a cyclic aluminoxane having a structure represented by the general formula {—Al(E$^2$)—O—}$_b$, and (B3) a linear aluminoxane having a structure represented by the general formula E$^3${—Al(E$^3$)—O—}$_c$AlE$^3_2$ (wherein $E^1$, $E^2$ and $E^3$ respectively represents a hydrocarbon group, all of $E^1$, $E^2$ and $E^3$ may be the same or different; Z represents a hydrogen atom or a halogen atom, and all of Z may be the same or different; a represents a numeral of 0 to 3; b represents an integer of not less than 2; and c represents an integer of not less than 1); and (C): a boron compound of any one of the following (C1) to (C3);

(C1) a boron compound represented by the general formula $BQ^1Q^2Q^3$, (C2) a boron compound represented by the general formula $G^+(BQ^1Q^2Q^3Q^4)^-$, and (C3) a boron compound represented by the general formula $(L-H)^+(BQ^1Q^2Q^3Q4)^-$ (wherein B represents a boron atom in the trivalent valence state; $Q^1$ to $Q^4$ may be the same or different and represent a halogen atom, a hydrocarbon group, a halogenated hydrocarbon group, a substituted silyl group, an alkoxy group or a di-substituted amino group; $G^+$ represents an inorganic or organic cation; L represents a neutral Lewis base; and $(L-H)^+$ represents a Brønsted acid).

The producing process is explained in more detail below.

(A) Transition Metal Complex

In the general formula [I], the transition metal atom represented by $M^1$ means a transition metal element of Group IV of the Periodic Table of the Elements (IUPAC Inorganic Chemistry Nomenclature, Revised Edition, 1989), and examples thereof include a titanium atom, zirconium atom, hafnium atom, etc. Among them, titanium atom or zirconium atom is preferred.

Examples of an atom of the XVI Group indicated as A in the general formula [I], include an oxygen atom, sulfur atom, selenium atom and the like. Among them, an oxygen atom is preferred.

Examples of an atom of the XIV Group indicated as J in the general formula [I], include a carbon atom, silicon atom, germanium atom and the like, a carbon atom and silicon atom are preferred, and a carbon atom is particularly preferred as J.

The group having a cyclopentadiene anion skeleton, as for the substituent $Cp^1$, includes $\eta^5$-(substituted) cyclopentadienyl group, $\eta^5$-(substituted)indenyl group, $\eta^5$-(substituted)fluorenyl group, etc. Specific examples thereof include $\eta^5$-cyclopentadienyl group, $\eta^5$-methylcyclopentadienyl group, $\eta^5$-dimethylcyclopentadienyl group, $\eta^5$-trimethylcyclopentadienyl group, $\eta^5$-tetramethylcyclopentadienyl group, $\eta^5$-ethylcyclopentadienyl group, $\eta^5$-n-propylcyclopentadienyl group, $\eta^5$-isopropylcyclopentadienyl group, $\eta^5$-n-butylcyclopentadienyl group, $\eta^5$-sec-butylcyclopentadienyl group, $\eta^5$-tert-butylcyclopentadienyl group, $\eta^5$-n-pentylcyclopentadienyl group, $\eta^5$-neopentylcyclopentadienyl group, $\eta^5$-n-hexylcyclopentadienyl group, $\eta^5$-n-octylcyclopentadienyl group, $\eta^5$-phenylcyclopentadienyl group, $\eta^5$-naphthylcyclopentadienyl group, $\eta^5$-trimethylsilylcyclopentadienyl group, $\eta^5$-triethylsilylcyclopentadienyl group, $\eta^5$-tert-butyldimethylsilylcyclopentadienyl group, $\eta^5$-indenyl group, $\eta^5$-methylindenyl group, $\eta^5$-dimethylindenyl group, $\eta^5$-ethylindenyl group, $\eta^5$-n-propylindenyl group, $\eta^5$-isopropylindenyl group, $\eta^5$-n-butylindenyl group, $\eta^5$-sec-butylindenyl group, $\eta^5$-tert-butylindenyl group, $\eta^5$-n-pentylindenyl group, $\eta^5$-neopentylindenyl group, $\eta^5$-n-hexylindenyl group, $^5$-n-octylindenyl group, $\eta^5$-n-decylindenyl group, $\eta^5$-phenylindenyl group, $\eta^5$-methylphenylindenyl group, $\eta^5$-naphthylindenyl group, $\eta^5$-trimethylsilylindenyl group, $\eta^5$-triethylsilylindenyl group, $\eta^5$-tert-butyldimethylsilylindenyl group, $\eta^5$-tetrahydroindenyl group, $\eta^5$-fluorenyl group, $\eta^5$-methylfluorenyl group, $\eta^5$-dimethylfluorenyl group, $\eta^5$-ethylfluorenyl group, $\eta^5$-diethylfluorenyl group, $\eta^5$-n-propylfluorenyl group, $\eta^5$-di-n-propylfluorenyl group, $\eta^5$-isopropylfluorenyl group, $\eta^5$-diisopropylfluorenyl group, $\eta^5$-n-butylfluorenyl group, $\eta^5$-sec-butylfluorenyl group, $\eta^5$-tert-butylfluorenyl group, $\eta^5$-di-n-butylfluorenyl group, $\eta^5$-di-sec-butylfluorenyl group, $\eta^5$-di-tert-butylfluorenyl group, $\eta^5$-n-pentylfluorenyl group, $\eta^5$-neopentylfluorenyl group, $\eta^5$-n-hexylfluorenyl group, $\eta^5$-n-octylfluorenyl group, $\eta^5$-n-decylfluorenyl group, $\eta^5$-n-dodecylfluorenyl group, $\eta^5$-phenylfluorenyl group, $\eta^5$-diphenylfluorenyl group, $\eta^5$-methylphenylfluorenyl group, $\eta^5$-naphthylfluorenyl group, $\eta^5$-trimethylsilylfluorenyl group, $\eta^5$-bis-trimethylsilylfluorenyl group, $\eta^5$-triethylsilylfluorenyl group, $\eta^5$-tert-butyldimethylsilylfluorenyl group, etc. Among them, an $\eta^5$-cyclopentadienyl group, $\eta^5$-methylcyclopentadienyl group, $\eta^5$-tert-butylcyclopentadienyl group, $\eta^5$-tetramethylcyclopentadienyl group, $\eta^5$-indenyl group and $\eta^5$-fluorenyl group are particularly preferred.

Examples of the halogen atom in the substituent $X^1$, $X^2$, $R^1$, $R^2$, $R^3$, $R^4$, $R^5$ or $R^6$ include a fluorine atom, chlorine atom, bromine atom, iodine atom and the like, preferably a chlorine atom or bromine atom, more preferably a chlorine atom.

As the alkyl group in the substituent $X^1$, $X^2$, $R^1$, $R^2$, $R^3$, $R^4$, $R^5$ or $R^6$, an alkyl group having 1 to 20 carbon atoms is preferred. Examples thereof include methyl group, ethyl group, n-propyl group, isopropyl group, n-butyl group, sec-butyl group, tert-butyl group, n-pentyl group, neopentyl group, sec-amyl group, n-hexyl group, n-octyl group, n-decyl group, n-dodecyl group, n-pentadecyl group, n-eicosyl group, etc., more preferably a methyl group, ethyl group, isopropyl group, tert-butyl group or sec-amyl group.

All of these alkyl groups may be substituted with a halogen atom (e.g. a fluorine atom, chlorine atom, bromine atom or iodine atom). Examples of the alkyl group having 1 to 20 carbon atoms, which is substituted with the halogen atom, include fluoromethyl group, difluoromethyl group, trifluoromethyl group, chloromethyl group, dichloromethyl group, trichloromethyl group, bromomethyl group, dibromomethyl group, tribromomethyl group, iodomethyl group, diiodomethyl group, triiodomethyl group, fluoroethyl group, difluoroethyl group, trifluoroethyl group, tetrafluoroethyl group, pentafluoroethyl group, chloroethyl group, dichloroethyl group, trichloroethyl group, tetrachloroethyl group, pentachloroethyl group, bromoethyl group, dibromoethyl group, tribromoethyl group, tetrabromoethyl group, pentabromoethyl group, perfluoropropyl group, perfluorobutyl group, perfluoropentyl group, perfluorohexyl group, perfluorooctyl group, perfluorododecyl group, perfluoropentadecyl group, perfluoroeicosyl group, perchloropropyl group, perchlorobutyl group, perchloropentyl group, perchlorohexyl group, perchlorooctyl group, perchlorododecyl group, perchloropentadecyl group, perchloroeicosyl group, perbromopropyl group, perbromobutyl group, perbromopentyl group, perbromohexyl group, perbromooctyl group, perbromododecyl group, perbromopentadecyl group, perbromoeicosyl group, etc.

All of these alkyl groups may be partially substituted with an alkoxy group such as a methoxy group, ethoxy group, etc., an aryloxy group such as phenoxy group, etc. or an aralkyloxy group such as benzyloxy group, etc.

As the aralkyl group in the substituent $X^1$, $X^2$, $R^1$, $R^2$, $R^3$, $R^4$, $R^5$ or $R^6$, an aralkyl group having 7 to 20 carbon atoms is preferred. Examples thereof include benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (3,5-dimethylphenyl)methyl group, (4,6-dimethylphenyl)methyl group, (2,3,4-timethylphenyl) methyl group, (2,3,5-timethylphenyl)methyl group, (2,3,6-timethylphenyl)methyl group, (3,4,5-timethylphenyl)methyl group, (2,4,6-timethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl) methyl group, (ethylphenyl)methyl group, (n-propylphenyl) methyl group, (isopropylphenyl)methyl group, (n-butylphenyl)methyl group, (sec-butylphenyl)methyl group, (tert-butylphenyl)methyl group, (n-pentylphenyl) methyl group, (neopentylphenyl)methyl group, (n-hexylphenyl)methyl group, (n-octylphenyl)methyl group, (n-decylphenyl)methyl group, (n-dodecylphenyl)methyl group, (n-tetradecylphenyl)methyl group, naphthylmethyl group, anthracenylmethyl group, etc., more preferably a benzyl group.

All of these aralkyl groups may be partially substituted with a halogen atom (e.g. a fluorine atom, chlorine atom, bromine atom or iodine atom), an alkoxy group such as a methoxy group, ethoxy group, etc., an aryloxy group such as a phenoxy group, etc. or an aralkyloxy group such as a benzyloxy group, etc.

As the aryl group in the substituent $X^1$, $X^2$, $R^1$, $R^2$, $R^3$, $R^4$, $R^5$ or $R^6$, an aryl group having 6 to 20 carbon atoms is preferred. Examples thereof include a phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, n-propylphenyl group, isopropylphenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group, anthracenyl group, etc., more preferably phenyl group.

All of these aryl groups may be partially substituted with a halogen atom (e.g. a fluorine atom, chlorine atom, bromine atom or iodine atom), an alkoxy group such as a methoxy group, ethoxy group, etc., an aryloxy group such as a phenoxy group, etc. or an aralkyloxy group such as a benzyloxy group, etc.

The substituted silyl group in the substituent $X^1$, $X^2$, $R^1$, $R^2$, $R^3$, $R^4$, $R^5$ or $R^6$ is a silyl group substituted with a hydrocarbon group, and examples of the hydrocarbon group include an alkyl group having 1 to 10 carbon atoms, such as a methyl group, ethyl group, n-propyl group, isopropyl group, n-butyl group, sec-butyl group, tert-butyl group, isobutyl group, n-pentyl group, n-hexyl group, cyclohexyl group, etc., and an aryl group such as a phenyl group. Examples of the substituted silyl group having 1 to 20 carbon atoms include mono-substituted silyl group having 1 to 20 carbon atoms, such as a methylsilyl group, ethylsilyl group, phenylsilyl group, etc.; di-substituted silyl group having 2 to 20 carbon atoms, such as a dimethylsilyl group, diethylsilyl group, diphenylsilyl group, etc.; and tri-substituted silyl group having 3 to 20 carbon atoms, such as a trimethylsilyl group, triethylsilyl group, tri-n-propylsilyl group, triisopropylsilyl group, tri-n-butylsilyl group, tri-sec-butylsilyl group, tri-tert-butylsilyl group, tri-isobutylsilyl group, tert-butyl-dimethylsilyl group, tri-n-pentylsilyl group, tri-n-hexylsilyl group, tricyclohexylsilyl group, triphenylsilyl group, etc., preferably trimethylsilyl group, tert-butyldimethylsilyl group or triphenylsilyl group.

All of the hydrocarbon groups of these substituted silyl groups may be partially substituted with a halogen atom (e.g. a fluorine atom, chlorine atom, bromine atom or iodine atom), an alkoxy group such as a methoxy group, ethoxy group, etc., an aryloxy group such as a phenoxy group, etc. or an aralkyloxy group such as a benzyloxy group, etc.

As the alkoxy group in the substituent $X^1$, $X^2$, $R^1$, $R^2$, $R^3$, $R^4$, $R^5$ or $R^6$, an alkoxy group having 1 to 20 carbon atoms is preferred. Examples thereof include a methoxy group, ethoxy group, n-propoxy group, isopropoxy group, n-butoxy group, sec-butoxy group, tert-butoxy group, n-pentoxy group, neopentoxy group, n-hexoxy group, n-octoxy group, n-dodecoxy group, n-pentadecoxy group, n-eicosoxy group, etc., more preferably methoxy group, ethoxy group or tert-butoxy group.

All of these alkoxy groups may be partially substituted with a halogen atom (e.g. a fluorine atom, chlorine atom, bromine atom or iodine atom), an alkoxy group such as a methoxy group, ethoxy group, etc., an aryloxy group such as a phenoxy group, etc. or an aralkyloxy group such as a benzyloxy group, etc.

As the aralkyloxy group in the substituent $X^1$, $X^2$, $R^1$, $R^2$, $R^3$, $R^4$, $R^5$ or $R^6$, an aralkyloxy group having 7 to 20 carbon atoms is preferred. Examples thereof include a benzyloxy group, (2-methylphenyl)methoxy group, (3-methylphenyl) methoxy group, (4-methylphenyl)methoxy group, (2,3-dimethylphenyl)methoxy group, (2,4-dimethylphenyl) methoxy group, (2,5-dimethylphenyl)methoxy group, (2,6-dimethylphenyl)methoxy group, (3,4-dimethylphenyl) methoxy group, (3,5-dimethylphenyl)methoxy group, (2,3,4-trimethylphenyl)methoxy group, (2,3,5-trimethylphenyl) methoxy group, (2,3,6-trimethylphenyl)methoxy group, (2,4,5-trimethylphenyl)methoxy group, (2,4,6-trimethylphenyl)methoxy group, (3,4,5-trimethylphenyl) methoxy group, (2,3,4,5-tetramethylphenyl)methoxy group, (2,3,4,6-tetramethylphenyl)methoxy group, (2,3,5,6-tetramethylphenyl)methoxy group, (pentamethylphenyl) methoxy group, (ethylphenyl)methoxy group, (n-propylphenyl)methoxy group, (isopropylphenyl)methoxy group, (n-butylphenyl)methoxy group, (sec-butylphenyl) methoxy group, (tert-butylphenyl)methoxy group, (n-hexylphenyl)methoxy group, (n-octylphenyl)methoxy group, (n-decylphenyl)methoxy group, (n-tetradecylphenyl) methoxy group, naphthylmethoxy group, anthracenylmethoxy group, etc., more preferably a benzyloxy group.

All of these aralkyloxy groups may be partially substituted with a halogen atom (e.g. a fluorine atom, chlorine atom, bromine atom or iodine atom), an alkoxy group such as a methoxy group, ethoxy group, etc., an aryloxy group such as a phenoxy group, etc. or an aralkyloxy group such as a benzyloxy group, etc.

As the aryloxy group in the substituent $X^1$, $X^2$, $R^1$, $R^2$, $R^3$, $R^4$, $R^5$ or $R^6$, an aralkyloxy group having 6 to 20 carbon atoms is preferred. Examples thereof include a phenoxy group, 2-methylphenoxy group, 3-methylphenoxy group, 4-methylphenoxy group, 2,3-dimethylphenoxy group, 2,4-dimethylphenoxy group, 2,5-dimethylphenoxy group, 2,6-dimethylphenoxy group, 3,4-dimethylphenoxy group, 3,5-dimethylphenoxy group, 2,3,4-trimethylphenoxy group, 2,3,5-trimethylphenoxy group, 2,3,6-trimethylphenoxy group, 2,4,5-trimethylphenoxy group, 2,4,6-trimethylphenoxy group, 3,4,5-trimethylphenoxy group, 2,3,4,5-tetramethylphenoxy group, 2,3,4,6-tetramethylphenoxy group, 2,3,5,6-tetramethylphenoxy group, pentamethylphenoxy group, ethylphenoxy group, n-propylphenoxy group, isopropylphenoxy group, n-butylphenoxy group, sec-butylphenoxy group, tert-butylphenoxy group, n-hexylphenoxy group, n-octylphenoxy group, n-decylphenoxy group, n-tetradecylphenoxy group, naphthoxy group, anthracenoxy group, etc.

All of these aryloxy groups may be partially substituted with a halogen atom (e.g. a fluorine atom, chlorine atom, bromine atom or iodine atom), an alkoxy group such as a methoxy group, ethoxy group, etc., an aryloxy group such as a phenoxy group, etc. or an aralkyloxy group such as a benzyloxy group, etc.

The di-substituted amino group in the substituent $X^1$, $X^2$, $R^1$, $R^2$, $R^3$, $R^4$, $R^5$ or $R^6$ is an amino group substituted with two hydrocarbon groups, and examples of the hydrocarbon group include alkyl group having 1 to 10 carbon atoms, such as a methyl group, ethyl group, n-propyl group, isopropyl group, n-butyl group, sec-butyl group, tert-butyl group, isobutyl group, n-pentyl group, n-hexyl group, cyclohexyl group, etc.; aryl group having 6 to 10 carbon atoms, such as phenyl group, etc.; and aralkyl group having 7 to 10 carbon atoms. Examples of the di-substituted amino group substituted with the hydrocarbon group having 1 to 10 carbon atoms include dimethylamino group, diethylamino group, di-n-propylamino group, diisopropylamino group, di-n-butylamino group, di-sec-butylamino group, di-tert-butylamino group, di-isobutylamino group, tert-butylisopropylamino group, di-n-hexylamino group, di-n-octylamino group, di-n-decylamino group, diphenylamino group, bistrimethylsilylamino group, bis-tert-butyldimethylsilylamino group, etc., preferably dimethylamino group or diethylamino group.

The substituent $R^1$, $R^2$, $R^3$, $R^4$, $R^5$ and $R^6$ may be optionally combined with each other to form a ring. $R^1$ is preferably an alkyl group, an aralkyl group, an aryl group or a substituted silyl group.

Preferably, each of $X^1$ and $X^2$ is independently a halogen atom, an alkyl group, an aralkyl group, an alkoxy group, an aryloxy group or a di-substituted amino group, more preferably a halogen atom.

Examples of the transition metal complex A include transition metal complexes wherein J is a carbon atom in the general formula [I], such as methylene(cyclopentadienyl)(3,5-dimethyl-2-phenoxy)titanium dichloride, methylene(cyclopentadienyl)(3-tert-butyl-2-phenoxy)titanium dichloride, methylene(cyclopentadienyl)(3-tert-butyl-5-methyl-2-phenoxy)titanium dichloride, methylene(cyclopentadienyl)(3-phenyl-2-phenoxy)titanium dichloride, methylene(cyclopentadienyl)(3-tert-butyldimethylsilyl-methyl-2-phenoxy)titanium dichloride, methylene(cyclopentadienyl)(3-trimethylsilyl-5-methyl-2-phenoxy)titanium dichloride, methylene(cyclopentadienyl)(3-tert-butyl-5-methoxy-2-phenoxy)titanium dichloride, methylene(cyclopentadienyl)(3-tert-butyl-5-chloro-2-phenoxy)titanium dichloride, methylene(methylcyclopentadienyl)(3,5-dimethyl-2-phenoxy)titanium dichloride, methylene(methylcyclopentadienyl)(3-tert-butyl-2-phenoxy)titanium dichloride, methylene(methylcyclopentadienyl)(3-tert-butyl-5-methyl-2-phenoxy)titanium dichloride, methylene(methylcyclopentadienyl)(3-phenyl-2-phenoxy)titanium dichloride, methylene(methylcyclopentadienyl)(3-tert-butyldimethylsilyl-5-methyl-2-phenoxy)titanium dichloride, methylene(methylcyclopentadienyl)(3-trimethylsilyl-5-methyl-2-phenoxy)titanium dichloride, methylene(methylcyclopentadienyl)(3-tert-butyl-5-methoxy-2-phenoxy)titanium dichloride, methylene(methylcyclopentadienyl)(3-tert-butyl-5-chloro-2-phenoxy)titanium dichloride, methylene(tert-butylcyclopentadienyl)(3,5-dimethyl-2-phenoxy)titanium dichloride, methylene(tert-butylcyclopentadienyl)(3-tert-butyl-2-phenoxy)titanium dichloride, methylene(tert-butylcyclopentadienyl)(3-tert-butyl-5-methyl-2-phenoxy)titanium dichloride, methylene(tert-butylcyclopentadienyl)(3-phenyl-2-phenoxy)titanium dichloride, methylene(tert-butylcyclopentadienyl)(3-tert-butyldimethylsilyl-5-methyl-2-phenoxy)titanium dichloride, methylene(tert-butylcyclopentadienyl)(3-trimethylsilyl-5-methyl-2-phenoxy)titanium dichloride, methylene(tert-butylcyclopentadienyl)(3-tert-butyl-5-methoxy-2-phenoxy)titanium dichloride, methylene(tert-butylcyclopentadienyl)(3-tert-butyl-5-chloro-2-phenoxy)titanium dichloride, methylene(tetramethylcyclopentadienyl)(3,5-dimethyl-2-phenoxy)titanium dichloride, methylene(tetramethylcyclopentadienyl)(3-tert-butyl-2-phenoxy)titanium dichloride, methylene(tetramethylcyclopentadienyl)(3-tert-butyl-5-methyl-2-phenoxy)titanium dichloride, methylene(tetramethylcyclopentadienyl)(3-phenyl-2-phenoxy)titanium dichloride, methylene(tetramethylcyclopentadienyl)(3-tert-butyldimethylsilyl-5-methyl-2-phenoxy)titanium dichloride, methylene(tetramethylcyclopentadienyl)(3-trimethylsilyl-5-methyl-2-phenoxy)titanium dichloride, methylene(tetramethylcyclopentadienyl)(3-tert-butyl-5-methoxy-2-phenoxy)titanium dichloride, methylene(tetramethylcyclopentadienyl)(3-tert-butyl-5-chloro-2-phenoxy)titanium dichloride, methylene(trimethylsilylcyclopentadienyl)(3,5-dimethyl-2-phenoxy)titanium dichloride, methylene(trimethylsilylcyclopentadienyl)(3-tert-butyl-2-phenoxy)titanium dichloride, methylene(trimethylsilylcyclopentadienyl)(3-tert-butyl-5-methyl-2-phenoxy)titanium dichloride, methylene(trimethylsilylcyclopentadienyl)(3-phenyl-2-phenoxy)titanium dichloride, methylene(trimethylsilylcyclopentadienyl)(3-tert-butyldimethylsilyl-5-methyl-2-phenoxy)titanium dichloride, methylene(trimethylsilylcyclopentadienyl)(3-trimethylsilyl-5-methyl-2-phenoxy)titanium dichloride, methylene(trimethylsilylcyclopentadienyl)(3-tert-butyl-5-methoxy-2-phenoxy)titanium dichloride, methylene(trimethylsilylcyclopentadienyl)(3-tert-butyl-5-chloro-2-phenoxy)titanium dichloride, methylene(fluorenyl)(3,5-dimethyl-2-phenoxy)titanium dichloride, methylene(fluorenyl)(3-tert-butyl-2-phenoxy)titanium dichloride, methylene(fluorenyl)(3-tert-butyl-5-methyl-2-phenoxy)titanium dichloride, methylene(fluorenyl)(3-phenyl-2-phenoxy)titanium dichloride, methylene(fluorenyl)(3-tert-butyldimethylsilyl-5-methyl-2-phenoxy)titanium dichloride, methylene(fluorenyl)(3-trimethylsilyl-5-methyl-2-phenoxy)titanium dichloride, methylene(fluorenyl)(3-tert-butyl-5-methoxy-2-phenoxy)titanium dichloride, methylene(fluorenyl)(3-tert-butyl-5-chloro-2-phenoxy)titanium dichloride, isopropylidene(cyclopentadienyl)(3,5-dimethyl- 2-phenoxy)titanium dichloride, isopropylidene(cyclopentadienyl)(3-tert-butyl-2-phenoxy)titanium dichloride, isopropylidene(cyclopentadienyl)(3-tert-butyl-5-methyl-2-phenoxy)titanium dichloride, isopropylidene(cyclopentadienyl)(3-phenyl-2-phenoxy)titanium dichloride, isopropylidene(cyclopentadienyl)(3-tert-butyldimethylsilyl-5-methyl-2-phenoxy)titanium dichloride, isopropylidene(cyclopentadienyl)(3-trimethylsilyl-5-methyl-2-phenoxy)titanium dichloride, isopropylidene(cyclopentadienyl)(3-tert-butyl-5-methoxy-2-phenoxy)titanium dichloride, isopropylidene(cyclopentadienyl)(3-tert-butyl-5-chloro-2-phenoxy)titanium dichloride, isopropylidene(methylcyclopentadienyl)(3,5-dimethyl-2-phenoxy)titanium dichloride, isopropylidene(methylcyclopentadienyl)(3-tert-butyl-2-phenoxy)titanium dichloride, isopropylidene(methylcyclopentadienyl)(3-tert-butyl-5-methyl-2-phenoxy)titanium dichloride, isopropylidene(methylcyclopentadienyl)(3-phenyl-2-phenoxy)titanium dichloride, isopropylidene(methylcyclopentadienyl)(3-tert-butyldimethylsilyl-5-methyl-2-phenoxy)titanium dichloride, isopropylidene(methylcyclopentadienyl)(3-trimethylsilyl-5-methyl-2-phenoxy)titanium dichloride, isopropylidene(methylcyclopentadienyl)(3-tert-butyl-5-methoxy-2-phenoxy)titanium dichloride, isopropylidene(methylcyclopentadienyl)(3-tert-butyl-5-chloro-2-phenoxy)titanium dichloride, isopropylidene(tert-butylcyclopentadienyl)(3,5-dimethyl-2-phenoxy)titanium dichloride, isopropylidene(tert-butylcyclopentadienyl)(3-tert-butyl-2-phenoxy)titanium dichloride, isopropylidene(tert-butylcyclopentadienyl)(3-tert-butyl-5-methyl-2-phenoxy)titanium dichloride, isopropylidene(tert-butylcyclopentadienyl)(3-phenyl-2-phenoxy)titanium dichloride, isopropylidene(tert-butylcyclopentadienyl)(3-tert-butyldimethylsilyl-5-methyl-2-phenoxy)titanium dichloride, isopropylidene(tert-butylcyclopentadienyl)(3-trimethylsilyl-5-methyl-2-phenoxy)titanium dichloride, isopropylidene(tert-butylcyclopentadienyl)(3-tert-butyl-5-methoxy-2-phenoxy)titanium dichloride, isopropylidene(tert-butylcyclopentadienyl)(3-tert-butyl-5-chloro-2-phenoxy)titanium dichloride, isopropylidene(tetramethylcyclopentadienyl)(3,5-dimethyl-2-phenoxy)titanium dichloride, isopropylidene(tetramethylcyclopentadienyl)(3-tert-butyl-2-phenoxy)titanium dichloride, isopropylidene(tetramethylcyclopentadienyl)(3-tert-butyl-5-methyl-2-phenoxy)titanium dichloride, isopropylidene(tetramethylcyclopentadienyl)(3-phenyl-2-phenoxy)titanium dichloride, isopropylidene(tetramethylcyclopentadienyl)(3-tert-butyldimethylsilyl-5-methyl-2-phenoxy)titanium dichloride, isopropylidene(tetramethylcyclopentadienyl)(3-trimethylsilyl-5-methyl-2-phenoxy)titanium dichloride, isopropylidene(tetramethylcyclopentadienyl)(3-tert-butyl-5-methoxy-2-phenoxy)titanium dichloride, isopropylidene(tetramethylcyclopentadienyl)(3-tert-butyl-5-chloro-2-phenoxy)titanium dichloride, isopropylidene(trimethylsilylcyclopentadienyl)(3,5-dimethyl-2-phenoxy)titanium dichloride, isopropylidene(trimethylsilylcyclopentadienyl)(3-tert-butyl-2-phenoxy)titanium dichloride, isopropylidene(trimethylsilylcyclopentadienyl)(3-tert-butyl-5-methyl-2-phenoxy)titanium dichloride, isopropylidene(trimethylsilylcyclopentadienyl)(3-phenyl-2-phenoxy)titanium dichloride, isopropylidene(trimethylsilylcyclopentadienyl)(3-tert-butyldimethylsilyl-5-methyl-2-phenoxy)titanium dichloride, isopropylidene(trimethylsilylcyclopentadienyl)(3-trimethylsilyl-5-methyl-2-phenoxy)titanium dichloride, isopropylidene(trimethylsilylcyclopentadienyl)(3-tert-butyl-5-methoxy-2-phenoxy)titanium dichloride, isopropylidene(trimethylsilylcyclopentadienyl)(3-tert-butyl-5-chloro-2-phenoxy)titanium dichloride, isopropylidene(fluorenyl)(3,5-dimethyl-2-phenoxy)titanium dichloride, isopropylidene(fluorenyl)(3-tert-butyl-2-phenoxy)titanium dichloride, isopropylidene(fluorenyl)(3-tert-butyl-5-methyl-2-phenoxy)titanium dichloride, isopropylidene(fluorenyl)(3-phenyl-2-phenoxy)titanium dichloride, isopropylidene(fluorenyl)(3-tert-butyldimethylsilyl-5-methyl-2-phenoxy)titanium dichloride, isopropylidene(fluorenyl)(3-trimethylsilyl-5-methyl-2-phenoxy)titanium dichloride, isopropylidene(fluorenyl)(3-tert-butyl-5-methoxy-2-phenoxy)titanium dichloride, isopropylidene(fluorenyl)(3-tert-butyl-5-chloro-2-phenoxy)titanium dichloride, diphenylmethylene(cyclopentadienyl)(3,5-dimethyl-2-phenoxy)titanium dichloride, diphenylmethylene(cyclopentadienyl)(3-tert-butyl-2-phenoxy)titanium dichloride, diphenylmethylene(cyclopentadienyl)(3-tert-butyl-5-methyl-2-phenoxy)titanium dichloride, diphenylmethylene(cyclopentadienyl)(3-phenyl-2-phenoxy)titanium dichloride, diphenylmethylene(cyclopentadienyl)(3-tert-butyldimethylsilyl-5-methyl-2-phenoxy)titanium dichloride, diphenylmethylene(cyclopentadienyl)(3-trimethylsilyl-5-methyl-2-phenoxy)titanium dichloride, diphenylmethylene(cyclopentadienyl)(3-tert-butyl-5-methoxy-2-phenoxy)titanium dichloride, diphenylmethylene(cyclopentadienyl)(3-tert-butyl-5-chloro-2-phenoxy)titanium dichloride, diphenylmethylene(methylcyclopentadienyl)(3,5-dimethyl-2-phenoxy)titanium dichloride, diphenylmethylene(methylcyclopentadienyl)(3-tert-butyl-2-phenoxy)titanium dichloride, diphenylmethylene(methylcyclopentadienyl)(3-tert-butyl-5-methyl-2-phenoxy)titanium dichloride, diphenylmethylene(methylcyclopentadienyl)(3-phenyl-2-phenoxy)titanium dichloride, diphenylmethylene(methylcyclopentadienyl)(3-tert-butyldimethylsilyl-5-methyl-2-phenoxy)titanium dichloride, diphenylmethylene(methylcyclopentadienyl)(3-trimethylsilyl-5-methyl-2-phenoxy)titanium dichloride, diphenylmethylene(methylcyclopentadienyl)(3-tert-butyl-5-methoxy-2-phenoxy)titanium dichloride, diphenylmethylene(methylcyclopentadienyl)(3-tert-butyl-5-chloro-2-phenoxy)titanium dichloride, diphenylmethylene(tert-butylcyclopentadienyl)(3,5-dimethyl-2-phenoxy)titanium dichloride, diphenylmethylene(tert-butylcyclopentadienyl)(3-tert-butyl-2-phenoxy)titanium dichloride, diphenylmethylene(tert-butylcyclopentadienyl)(3-tert-butyl-5-methyl-2-phenoxy)titanium dichloride, diphenylmethylene(tert-butylcyclopentadienyl)(3-phenyl-2-phenoxy)titanium dichloride, diphenylmethylene(tert-butylcyclopentadienyl)(3-tert-butyldimethylsilyl-5-methyl-2-phenoxy)titanium dichloride, diphenylmethylene(tert-butylcyclopentadienyl)(3-trimethylsilyl-5-methyl-2-phenoxy)titanium dichloride, diphenylmethylene(tert-butylcyclopentadienyl)(3-tert-butyl-5-methoxy-2-phenoxy)titanium dichloride, diphenylmethylene(tert-butylcyclopentadienyl)(3-tert-butyl-5-chloro-2-phenoxy)titanium dichloride, diphenylmethylene(tetramethylcyclopentadienyl)(3,5-dimethyl-2-phenoxy)titanium dichloride, diphenylmethylene(tetramethylcyclopentadienyl)(3-tert-butyl-2-phenoxy)titanium dichloride, diphenylmethylene(tetramethylcyclopentadienyl)(3-tert-butyl-5-methyl-2- phenoxy)titanium dichloride, diphenylmethylene(tetramethylcyclopentadienyl)(3-phenyl-2-phenoxy)titanium dichloride, diphenylmethylene(tetramethylcyclopentadienyl)(3-tert-butyldimethylsilyl-5-methyl-2-phenoxy)titanium dichloride, diphenylmethylene(tetramethylcyclopentadienyl)(3-trimethylsilyl-5-methyl-2-phenoxy)titanium dichloride, diphenylmethylene(tetramethylcyclopentadienyl)(3-tert-butyl-5-methoxy-2-phenoxy)titanium dichloride, diphenylmethylene(tetramethylcyclopentadienyl)(3-tert-butyl-5-chloro-2-phenoxy)titanium dichloride, diphenylmethylene(trimethylsilylcyclopentadienyl)(3,5-dimethyl-2-phenoxy)titanium dichloride, diphenylmethylene(trimethylsilylcyclopentadienyl)(3-tert-butyl-2-phenoxy)titanium dichloride, diphenylmethylene(trimethylsilylcyclopentadienyl)(3-tert-butyl-5-methyl-2-phenoxy)titanium dichloride, diphenylmethylene(trimethylsilylcyclopentadienyl)(3-phenyl-2-phenoxy)titanium dichloride, diphenylmethylene(trimethylsilylcyclopentadienyl)(3-tert-butyldimethylsilyl-5-methyl-2-phenoxy)titanium dichloride, diphenylmethylene(trimethylsilylcyclopentadienyl)(3-trimethylsilyl-5-methyl-2-phenoxy)titanium dichloride, diphenylmethylene(trimethylsilylcyclopentadienyl)(3-tert-butyl-5-methoxy-2-phenoxy)titanium dichloride, diphenylmethylene(trimethylsilylcyclopentadienyl)(3-tert-butyl-5-chloro-2-phenoxy)titanium dichloride, diphenylmethylene(fluorenyl)(3,5-dimethyl-2-phenoxy)titanium dichloride, diphenylmethylene(fluorenyl)(3-tert-butyl-2-phenoxy)titanium dichloride, diphenylmethylene(fluorenyl)(3-tert-butyl-5-methyl-2-phenoxy)titanium dichloride, diphenylmethylene(fluorenyl)(3-phenyl-2-phenoxy)titanium dichloride, diphenylmethylene(fluorenyl)(3-tert-butyldimethylsilyl-5-methyl-2-phenoxy)titanium dichloride, diphenylmethylene(fluorenyl)(3-trimethylsilyl-5-methyl-2-phenoxy)titanium dichloride, diphenylmethylene(fluorenyl)(3-tert-butyl-5-methoxy-2-phenoxy)titanium dichloride, diphenylmethylene(fluorenyl)(3-tert-butyl-5-chloro-2-phenoxy)titanium dichloride, compounds wherein titanium of these compounds is replaced by zirconium or hafnium, compounds wherein dichloride of these compounds is replaced by dibromide, diiodide, bis(dimethylamide), bis(diethylamide), di-n-butoxide or diisopropoxide, compounds wherein (cyclopentadienyl) of these compounds is replaced by (dimethylcyclopentadienyl), (trimethylcyclopentadienyl), (n-butylcyclopentadienyl), (tert-butyldimethylsilylcyclopentadienyl) or (indenyl), and compounds wherein (3,5-dimethyl-2-phenoxy) of these compounds is replaced by (2-phenoxy), (3-methyl-2-phenoxy), (3,5-di-tert-butyl-2-phenoxy), (3-phenyl-5-methyl-2-phenoxy), (3-tert-butyldimethylsilyl-2-phenoxy) or (3-trimethylsilyl-2-phenoxy); and transition metal complexes wherein J is an atom of Group XIV of the Periodic Table of the Elements other than carbon atom, such as dimethylsilylene (cyclopentadienyl)(2-phenoxy)titanium dichloride, dimethylsilylene(cyclopentadienyl)(3-methyl-2-phenoxy)titanium dichloride, dimethylsilylene(cyclopentadienyl)(3,5-dimethyl-2-phenoxy)titanium dichloride, dimethylsilylene(cyclopentadienyl)(3-tert-butyl-2-phenoxy)titanium dichloride, dimethylsilylene(cyclopentadienyl)(3-tert-butyl-5-methyl-2-phenoxy)titanium dichloride, dimethylsilylene(cyclopentadienyl)(3,5-di-tert-butyl-2-phenoxy)titanium dichloride, dimethylsilylene(cyclopentadienyl)(5-methyl-3-phenyl-2-phenoxy)titanium dichloride, dimethylsilylene(cyclopentadienyl)(3-tert-butyldimethylsilyl-5-methyl-2-phenoxy)titanium dichloride, dimethylsilylene(cyclopentadienyl)(5-methyl-3-trimethylsilyl-2-phenoxy)titanium dichloride, dimethylsilylene(cyclopentadienyl)(3-tert-butyl-5-methoxy-2-phenoxy)titanium dichloride, dimethylsilylene(cyclopentadienyl)(3-tert-butyl-5-chloro-2-phenoxy)titanium dichloride, dimethylsilylene(cyclopentadienyl)(3,5-di-sec-amyl-2-phenoxy)titanium dichloride, dimethylsilylene(methylcyclopentadienyl)(2-phenoxy)titanium dichloride, dimethylsilylene(methylcyclopentadienyl)(3-methyl-2-phenoxy)titanium dichloride, dimethylsilylene(methylcyclopentadienyl)(3,5-dimethyl-2-phenoxy)titanium dichloride, dimethylsilylene(methylcyclopentadienyl)(3-tert-butyl-2-phenoxy)titanium dichloride, dimethylsilylene(methylcyclopentadienyl)(3-tert-butyl-5-methyl-2-phenoxy)titanium dichloride, dimethylsilylene(methylcyclopentadienyl)(3,5-di-tert-butyl-2-phenoxy)titanium dichloride, dimethylsilylene(methylcyclopentadienyl)(5-methyl-3-phenyl-2-phenoxy)titanium dichloride, dimethylsilylene(methylcyclopentadienyl)(3-tert-butyldimethylsilyl-5-methyl-2-phenoxy)titanium dichloride, dimethylsilylene(methylcyclopentadienyl)(5-methyl-3-trimethylsilyl-2-phenoxy)titanium dichloride, dimethylsilylene(methylcyclopentadienyl)(3-tert-butyl-5-methoxy-2-phenoxy)titanium dichloride, dimethylsilylene(methylcyclopentadienyl)(3-tert-butyl-5-chloro-2-phenoxy)titanium dichloride, dimethylsilylene(methylcyclopentadienyl)(3,5-di-sec-amyl-2-phenoxy)titanium dichloride, dimethylsilylene(n-butylcyclopentadienyl)(2-phenoxy)titanium dichloride, dimethylsilylene(n-butylcyclopentadienyl)(3-methyl-2-phenoxy)titanium dichloride, dimethylsilylene(n-butylcyclopentadienyl)(3,5-dimethyl-2-phenoxy)titanium dichloride, dimethylsilylene(n-butylcyclopentadienyl)(3-tert-butyl-2-phenoxy)titanium dichloride, dimethylsilylene(n-butylcyclopentadienyl)(3-tert-butyl-5-methyl-2-phenoxy)titanium dichloride, dimethylsilylene(n-butylcyclopentadienyl)(3,5-di-tert-butyl-2-phenoxy)titanium dichloride, dimethylsilylene(n-butylcyclopentadienyl)(5-methyl-3-phenyl-2-phenoxy)titanium dichloride, dimethylsilylene(n-butylcyclopentadienyl)(3-tert-butyldimethylsilyl-5-methyl-2-phenoxy)titanium dichloride, dimethylsilylene(n-butylcyclopentadienyl)(5-methyl-3-trimethylsilyl-2-phenoxy)titanium dichloride, dimethylsilylene(n-butylcyclopentadienyl)(3-tert-butyl-5-methoxy-2-phenoxy)titanium dichloride, dimethylsilylene(n-butylcyclopentadienyl)(3-tert-butyl-5-chloro-2-phenoxy)titanium dichloride, dimethylsilylene(n-butylcyclopentadienyl)(3,5-di-sec-amyl-2-phenoxy)titanium dichloride, dimethylsilylene(tert-butylcyclopentadienyl)(2-phenoxy)titanium dichloride, dimethylsilylene(tert-butylcyclopentadienyl)(3-methyl-2-phenoxy)titanium dichloride, dimethylsilylene(tert-butylcyclopentadienyl)(3,5-dimethyl-2-phenoxy)titanium dichloride, dimethylsilylene(tert-butylcyclopentadienyl)(3-tert-butyl-2-phenoxy)titanium dichloride, dimethylsilylene(tert-butylcyclopentadienyl)(3-tert-butyl-5-methyl-2-phenoxy)titanium dichloride, dimethylsilylene(tert-butylcyclopentadienyl)(3,5-di-tert-butyl-2-phenoxy)titanium dichloride, dimethylsilylene(tert-butylcyclopentadienyl)(5-methyl-3-phenyl-2-phenoxy)titanium dichloride, dimethylsilylene(tert-butylcyclopentadienyl)(3-tert-butyldimethylsilyl-5-methyl-2-phenoxy)titanium dichloride, dimethylsilylene(tert-butylcyclopentadienyl)(5-methyl-3-trimethylsilyl-2-phenoxy)titanium dichloride, dimethylsilylene(tert-butylcyclopentadienyl)(3-tert-butyl-5-methoxy-2-phenoxy) titanium dichloride, dimethylsilylene(tert-butylcyclopentadienyl)(3-tert-butyl-5-chloro-2-phenoxy) titanium dichloride, dimethylsilylene(tert-butylcyclopentadienyl)(3,5-di-sec-amyl-2-phenoxy) titanium dichloride, dimethylsilylene (tetramethylcyclopentadienyl)(2-phenoxy)titanium dichloride, dimethylsilylene(tetramethylcyclopentadienyl) (3-methyl-2-phenoxy)titanium dichloride, dimethylsilylene (tetramethylcyclopentadienyl)(3,5-dimethyl-2-phenoxy) titanium dichloride, dimethylsilylene (tetramethylcyclopentadienyl)(3-tert-butyl-2-phenoxy) titanium dichloride, dimethylsilylene (tetramethylcyclopentadienyl)(3-tert-butyl-5-methyl-2-phenoxy)titanium dichloride, dimethylsilylene (tetramethylcyclopentadienyl)(3,5-di-tert-butyl-2-phenoxy) titanium dichloride, dimethylsilylene (tetramethylcyclopentadienyl)(5-methyl-3-phenyl-2-phenoxy)titanium dichloride, dimethylsilylene (tetramethylcyclopentadienyl)(3-tert-butyldimethylsilyl-5-methyl-2-phenoxy)titanium dichloride, dimethylsilylene (tetramethylcyclopentadienyl)(5-methyl-3-trimethylsilyl-2-phenoxy)titanium dichloride, dimethylsilylene (tetramethylcyclopentadienyl)(3-tert-butyl-5-methoxy-2-phenoxy)titanium dichloride, dimethylsilylene (tetramethylcyclopentadienyl)(3-tert-butyl-5-chloro-2-phenoxy)titanium dichloride, dimethylsilylene (tetramethylcyclopentadienyl)(3,5-di-sec-amyl-2-phenoxy) titanium dichloride, dimethylsilylene (trimethylsilylcyclopentadienyl)(2-phenoxy)titanium dichloride, dimethylsilylene (trimethylsilylcyclopentadienyl)(3-methyl-2-phenoxy) titanium dichloride, dimethylsilylene (trimethylsilylcyclopentadienyl)(3,5-dimethyl-2-phenoxy) titanium dichloride, dimethylsilylene (trimethylsilylcyclopentadienyl)(3-tert-butyl-2-phenoxy) titanium dichloride, dimethylsilylene (trimethylsilylcyclopentadienyl)(3-tert-butyl-5-methyl-2-phenoxy)titanium dichloride, dimethylsilylene (trimethylsilylcyclopentadienyl)(3,5-di-tert-butyl-2-phenoxy)titanium dichloride, dimethylsilylene (trimethylsilylcyclopentadienyl)(5-methyl-3-phenyl-2-phenoxy)titanium dichloride, dimethylsilylene (trimethylsilylcyclopentadienyl)(3-tert-butyldimethylsilyl-5-methyl-2-phenoxy)titanium dichloride, dimethylsilylene (trimethylsilylcyclopentadienyl)(5-methyl-3-trimethylsilyl-2-phenoxy)titanium dichloride, dimethylsilylene (trimethylsilylcyclopentadienyl)(3-tert-butyl-5-methoxy-2-phenoxy)titanium dichloride, dimethylsilylene (trimethylsilylcyclopentadienyl)(3-tert-butyl-5-chloro-2-phenoxy)titanium dichloride, dimethylsilylene (trimethylsilylcyclopentadienyl)(3,5-di-sec-amyl-2-phenoxy)titanium dichloride, dimethylsilylene(indenyl)(2-phenoxy)titaniumdichloride, dimethylsilylene(indenyl)(3-methyl-2-phenoxy)titanium dichloride, dimethylsilylene (indenyl)(3,5-dimethyl-2-phenoxy)titanium dichloride, dimethylsilylene(indenyl)(3-tert-butyl-2-phenoxy)titanium dichloride, dimethylsilylene(indenyl)(3-tert-butyl-5-methyl-2-phenoxy)titanium dichloride, dimethylsilylene(indenyl) (3,5-di-tert-butyl-2-phenoxy)titanium dichloride, dimethylsilylene(indenyl)(5-methyl-3-phenyl-2-phenoxy) titanium dichloride, dimethylsilylene(indenyl)(3-tert-butyldimethylsilyl-5-methyl-2-phenoxy)titanium dichloride, dimethylsilylene(indenyl)(5-methyl-3-trimethylsilyl-2-phenoxy)titanium dichloride, dimethylsilylene(indenyl)(3-tert-butyl-5-methoxy-2-phenoxy)titanium dichloride, dimethylsilylene(indenyl)(3-tert-butyl-5-chloro-2-phenoxy)titanium dichloride, dimethylsilylene(indenyl)(3,5-di-sec-amyl-2-phenoxy) titanium dichloride, dimethylsilylene(fluorenyl)(2-phenoxy) titanium dichloride, dimethylsilylene(fluorenyl)(3-methyl-2-phenoxy)titanium dichloride, dimethylsilylene(fluorenyl) (3,5-dimethyl-2-phenoxy)titanium dichloride, dimethylsilylene(fluorenyl)(3-tert-butyl-2-phenoxy) titanium dichloride, dimethylsilylene(fluorenyl)(3-tert-butyl-5-methyl-2-phenoxy)titanium dichloride, dimethylsilylene(fluorenyl)(3,5-di-tert-butyl-2-phenoxy) titanium dichloride, dimethylsilylene(fluorenyl)(5-methyl-3-phenyl-2-phenoxy)titanium dichloride, dimethylsilylene (fluorenyl)(3-tert-butyldimethylsilyl-5-methyl-2-phenoxy) titanium dichloride, dimethylsilylene(fluorenyl)(5-methyl-3-trimethylsilyl-2-phenoxy)titanium dichloride, dimethylsilylene(fluorenyl)(3-tert-butyl-5-methoxy-2-phenoxy)titanium dichloride, dimethylsilylene(fluorenyl)(3-tert-butyl-5-chloro-2-phenoxy)titanium dichloride, dimethylsilylene(fluorenyl)(3,5-di-sec-amyl-2-phenoxy) titanium dichloride, dimethylsilylene (tetramethylcyclopentadienyl)(1-naphthox-2-yl)titanium dichloride, compounds wherein (cyclopentadienyl) of these compounds is replaced by (dimethylcyclopentadienyl), (trimethylcyclopentadienyl), (ethylcyclopentadienyl), (n-propylcyclopentadienyl), (isopropylcyclopentadienyl), (sec-butylcyclopentadienyl), (isobutylcyclopentadienyl), (tert-butyldimethylsilylcyclopentadienyl), (phenylcyclopentadienyl), (methylindenyl) or (phenylindenyl), compounds wherein (2-phenoxy) of these compounds is replaced by (3-phenyl-2-phenoxy), (3-trimethylsilyl-2-phenoxy) or (3-tert-butyldimethylsilyl-2-phenoxy), compounds wherein dimethylsilylene of these compounds is replaced by diethylsilylene, diphenylsilylene or dimethoxysilylene, compounds wherein titanium of these compounds is replaced by zirconium or hafnium, and compound wherein dichloride of these compounds is replaced by dibromide, diiodide, bis(dimethylamide), bis(diethylamide), di-n-butoxide or diisopropoxide.

The transition metal complex represented by the above general formula [I] can be synthesized, for example, by a method disclosed in Japanese Patent Publication (Kokai) No.9-87313 or the like.

(B) Aluminum Compound

The aluminum compound (B) used in the present invention includes publicly known organoaluminum compounds, that is, at least one aluminum compound selected from (B1) to (B3) described below:

(B1) an organoaluminum compound represented by the general formula $E^1{}_a AlZ_{3-a}$;

(B2) a cyclic aluminoxane having a structure represented by the general formula $\{-Al(E^2)-O-\}_b$; and (B3) a linear aluminoxane having a structure represented by the general formula $E^3\{-Al(E^3)-O-\}_c AlE^3{}_2$ (wherein $E^1$, $E^2$ and $E^3$ respectively represent a hydrocarbon group, all of $E^1$, all of $E^2$ and all of $E^3$ may be the same or different; Z represents a hydrogen atom or a halogen atom, and all of Z may be the same or different; a represents a number satisfying the expression $0 < a \leq 3$; b represents an integer of 2 or more and c represents an integer of 1 or more).

As the hydrocarbon group in $E^1$, $E^2$ or $E^3$, a hydrocarbon group having 1 to 8 carbon atoms is preferred and an alkyl group is more preferred.

Specific examples of the organoaluminum compound (B1) represented by $E^1{}_a AlZ_{3-a}$ include trialkylaluminums such as trimethylaluminum, triethylaluminum, tri-n-propylaluminum, triisopropylaluminum, triisobutylaluminum, tri-n-hexylaluminum, etc.; dialkylaluminum chlorides such as dimethylaluminum chloride, diethylaluminum chloride, di-n-propylaluminum chloride, diisopropylaluminum chloride, diisobutylaluminum chloride, di-n-hexylaluminum chloride, etc.; alkylaluminum dichlorides such as methylaluminum dichloride, ethylaluminum dichloride, n-propylaluminum dichloride, isopropylaluminum dichloride, isobutylaluminum dichloride, n-hexylaluminum dichloride, etc.; and dialkylaluminum hydrides such as dimethylaluminum hydride, diethylaluminum hydride, di-n-propylaluminum hydride, diisobutylaluminum hydride, di-n-hexylaluminum hydride, etc.

Among them, trialkylaluminum is preferred and triethylaluminum or triisobutylaluminum is more preferred.

Specific examples of $E^2$ and $E^3$ in (B2) a cyclic aluminoxane having a structure represented by the general formula $\{-Al(E^2)-O-\}_b$ and (B3) a linear aluminoxane having a structure represented by the general formula $E^3\{-Al(E^3)-O-\}_c AlE^3_2$ include alkyl group such as methyl group, ethyl group, n-propyl group, isopropyl group, n-butyl group, isobutyl group, n-pentyl group, neopentyl group, etc. b is an integer of 2 or more, c is an integer of 1 or more. Each of $E^2$ and $E^3$ is preferably a methyl group or isobutyl group. b is preferably from 2 to 40 and c is preferably from 1 to 40.

The above aluminoxane is prepared by various methods. The method is not specifically limited, and the aluminoxane may be prepared according to a publicly known method. For example, the aluminoxane is prepared by contacting a solution obtained by dissolving a trialkylaluminum (e.g. trimethylaluminum) in a suitable organic solvent (e.g. benzene, aliphatic hydrocarbon) with water. Also, there can be illustrated a method for preparing the aluminoxane by contacting a trialkylaluminum (e.g. trimethylaluminum, etc.) with a metal salt containing crystal water (e.g. copper sulfate hydrate, etc.).

(C) Boron Compound

As the boron compound (C) in the present invention, there can be used any one of (C1) a boron compound represented by the general formula $BQ^1Q^2Q^3$, (C2) a boron compound represented by the general formula $G^+(BQ^1Q^2Q^3Q^4)^-$ and (C3) a boron compound represented by the general formula $(L-H)^+(BQ^1Q^2Q^3Q^4)^-$.

In the boron compound (C1) represented by the general formula $BQ^1Q^2Q^3$, B represents a boron atom in the trivalent valence state; $Q^1$ to $Q^3$ may be the same or different and represent a halogen atom, a hydrocarbon group, a halogenated hydrocarbon group, a substituted silyl group, an alkoxy group or a di-substituted amino group. Each of $Q^1$ to $Q^3$ is preferably a halogen atom, a hydrocarbon group having 1 to 20 carbon atoms, a halogenated hydrocarbon group having 1 to 20 carbon atoms, a substituted silyl group having 1 to 20 carbon atoms, an alkoxy group having 1 to 20 carbon atoms or an amino group having 2 to 20 carbon atoms, more preferably a hydrocarbon group having 1 to 20 carbon atoms or a halogenated hydrocarbon group having 1 to 20 carbon atoms. More preferably, $Q^1$ to $Q^4$ are a fluorinated hydrocarbon group having 1 to 20 carbon atoms and containing at least one fluorine atom, and most preferably, $Q^1$ to $Q^4$ are a fluorinated aryl group having 6 to 20 carbon atoms and containing at least one fluorine atom.

Specific examples of the compound (C1) include tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, phenylbis(pentafluorophenyl)borane, etc., most preferably tris(pentafluorophenyl)borane.

In the boron compound (C2) represented by the general formula $G^+(BQ^1Q^2Q^3Q^4)^+$, $G^+$ represents an inorganic or organic cation; B represents a boron atom in the trivalent valence state; and $Q^1$ to $Q^4$ are the same as defined in $Q^1$ to $Q^3$.

Specific examples of $G^+$ as an inorganic cation in the compound represented by the general formula $G^+(BQ^1Q^2Q^3Q^4)^-$ include a ferrocenium cation, alkyl-substituted ferrocenium cation, silver cation, etc. Examples of the $G^+$ as an organic cation include a triphenylmethyl cation. $G^+$ is preferably a carbenium cation, particularly a triphenylmethyl cation. Examples of $(BQ^1Q^2Q^3Q^4)^-$ include tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,3,4-trifluorophenyl)borate, phenyltris(pentafluorophenyl)borate, tetrakis(3,5-bistrifluoromethylphenyl)borate, etc.

Specific combination of them include ferroceniumtetrakis(pentafluorophenyl)borate, 1,1'-dimethylferroceniumtetrakis(pentafluorophenyl)borate, silvertetrakis(pentafluorophenyl)borate, triphenylmethyltetrakis(pentafluorophenyl)borate, triphenylmethyltetrakis(3,5-bistrifluoromethylphenyl)borate, etc., most preferably triphenylmethyltetrakis(pentafluorophenyl)borate.

In the boron compound (C3) represented by the formula $(L-H)^+(BQ^1Q^2Q^3Q^4)^-$, L represents a neutral Lewis base; $(L-H)^+$ represents a Brønsted acid; B represents a boron atom in the trivalent valence state; and $Q^1$ to Q4 are the same as defined in $Q^1$ to $Q^3$.

Specific examples of $(L-H)^+$ as a Brønsted acid in the compound represented by the formula $(L-H)^+(BQ^1Q^2Q^3Q^4)^-$ include trialkyl-substituted ammoniums, N,N-dialkylaniliniums, dialkylammoniums, triarylphosphoniums, etc., and examples of $(BQ^1Q^2Q^3Q^4)^-$ include those as defined above.

Specific combination of them include triethylammoniumtetrakis(pentafluorophenyl)borate, tripropylammoniumtetrakis(pentafluorophenyl)borate, tri(n-butyl)ammoniumtetrakis(pentafluorophenyl)borate, tri(n-butyl)ammoniumtetrakis(3,5-bistrifluoromethylphenyl)borate, N,N-dimethylaniliniumtetrakis(pentafluorophenyl)borate, N,N-diethylaniliniumtetrakis(pentafluorophenyl)borate, N,N-2,4,6-pentamethylaniliniumtetrakis(pentafluorophenyl)borate, N,N-dimethylaniliniumtetrakis(3,5-bistrifluoromethylphenyl)borate, diisopropylammoniumtetrakis (pentafluorophenyl)borate, dicyclohexylammoniumtetrakis (pentafluorophenyl)borate, triphenylphosphoniumtetrakis(pentafluorophenyl)borate, tri(methylphenyl)phosphoniumtetrakis(pentafluorophenyl)borate, tri(dimethylphenyl)phosphoniumtetrakis(pentafluorophenyl)borate, etc., most preferably tri(n-butyl)ammoniumtetrakis(pentafluorophenyl)borate or N,N-dimethylanilinumtetrakis(pentafluorophenyl)borate.

[Polymerization]

The copolymer of the present invention can be obtained by conducting polymerization properly selecting conditions described below.

In the present invention, a catalyst for olefin polymerization, prepared by using a transition metal complex (A), and [a compound (B) and/or a compound (C)]. In case of using a catalyst for olefin polymerization, prepared by using two components (A) and (B), the above cyclic aluminoxane (B2) and/or linear aluminoxane (B3) are preferable as (B). Other preferable embodiment of the catalyst for olefin polymerization includes a catalyst for olefin polymerization, prepared by using the above (A), (B) and (C). As (B), the above (B1) is easily used.

The respective components are desirably used so that the molar ratio of (B)/(A) is usually within the range from 0.1 to 10000, preferably 5 to 2000 and the molar ratio of (C)/(A) is usually within the range from 0.01 to 100, preferably 0.5 to 10.

When the respective components are used in the state of a solution or state suspended in a solvent, the concentration of the respective components is appropriately selected according to the conditions such as ability of an apparatus for feeding the respective components in a polymerization reactor. The respective components are desirably used so that the concentration of (A) is usually from 0.01 to 500 $\mu$mol/g, preferably from 0.05 to 100 $\mu$mol/g, more preferably from 0.05 to 50 $\mu$mol/g; the concentration of (B) is usually from 0.01 to 10000 $\mu$mol/g, preferably from 0.1 to 5000 $\mu$mol/g, more preferably from 0.01 to 2000 $\mu$mol/g, in terms of Al atom; and the concentration of (C) is usually from 0.01 to 500 $\mu$mol/g, preferably from 0.05 to 200 $\mu$mol/g, more preferably from 0.05 to 100 $\mu$mol/g.

As the catalyst used in the present invention, an inorganic carrier such as $SiO_2$, $Al_2O_3$ or the like, and a particle-like carrier including an organic polymer carrier such as a polymer of an olefin such as ethylene, styrene or the like, etc. may be used in combination.

In practicing of the present invention process, the polymerization process has no restriction in particular, and an arbitrary process such as, for example, a batch-wise or continuous gas phase polymerization process, bulk polymerization process, solution polymerization process, or slurry polymerization process or the like can be used. When a solvent is used, various kind of solvents under a condition of not deactivating a catalyst can be used, and examples of such solvent include a hydrocarbon such as benzene, toluene, pentane, hexane, heptane, cyclohexane and the like; and a halogenated hydrocarbon such as methylene dichloride, dichlorostyrene and the like.

The polymerization temperature is not specifically limited, and −100 to 250° C. is usually adopted and −50 to 200° C. is preferably adopted. Further, the polymerization pressure is not limited, but is carried out usually under a pressure of 100 kg/cm$^2$ or less and preferably 2 kg/cm$^2$ to 50 kg/cm$^2$. And, a chain transfer agent such as hydrogen or the like can be added in order to adjust the molecular weight of the polymer.

Polystyrene is not substantially produced as by-product by such production process of the present invention.

Such copolymer of the present invention can be used for a molded article such as a film, sheet or container, or the like, and is particularly suitable for a film or sheet.

The film or sheet is obtained, for example, by a inflation molding in which a melted resin is extruded from a circular die and a film inflated in tubular shape is wound up, by a T-die molding in which a melted resin is extruded from a linear T-die and a film or sheet is wound up, by a calendering or the like.

The molded article of the present invention has properties excellent in elastic recoverability, delay recoverability, vibration suppression performance. Further, in the present invention, the copolymer excellent in transparency, flexibility, scratch resistance, and mechanical strength can be obtained. The scratch resistance can be investigated with a HEIDON surface tester, and the flexibility, elastic recoverability, delay recoverability and suppression performance can be investigated by tensile test and a solid dynamic viscoelasticity test.

The copolymer of the present invention can be also used in a form of a multi-layer film or sheet of 2 layers or more with other materials. Thereat, the film or sheet can be produced by known various kinds of lamination processes such as a co-extrusion process, a dry-lamination process, a sandwich-lamination process, an extrusion-lamination process and the like, etc. As other materials, known materials such as paper, a pasteboard, an aluminum thin film, a cellophane, Nylon, polyethylene terephthalate(PET), polypropylene, polyvinylidene chloride and the like can be used.

Molded articles obtained by a blow molding and an injection molding are also included in the molded article of the present invention.

The molded article of the present invention can contain known additives such as antioxidants, weather resistant agents, lubricants, anti-blocking agents, anti-static agents, anti-clouding agents, anti-drop agents, pigments, fillers and the like, according to requirement. Further, known polymer materials such as a low density polyethylene obtained by a radical polymerization process, high density polyethylene, linear low density polyethylene, ethylene-α-olefin copolymer elastomer and polypropylene, and the like may be blended.

The film or sheet of the present invention can be subjected to a publicly known post-treatment such as a corona discharge treatment, a plasma treatment, an ozone treatment, an ultra-violet rays irradiation, an electron beam irradiation or the like.

EXAMPLE

The present invention is further illustrated in detail according to Examples and Comparative Examples below, but the scope of the present invention is not restricted by such Examples. Further, physical properties of polymers in Examples were measured according to methods described below.

The intrinsic viscosity ([η]) was measured at 135° C. using tetralin as a solvent with an Ubbelohde viscometer.

The glass transition point was measured under conditions below with DSC (SSC-5200 manufacture by Seiko Electronics Co., Ltd.) and determined by its inflection point.

Heating: 20° C. to 200° C. (20° C./min.), retention for 10 minutes

Cooling: 200° C. to −50° C. (20° C./min.), retention for 10 minutes

Measurement: −50° C. to 300° C. (20° C./min.)

The molecular weight and molecular weight distribution were determined under conditions below with a Gel Permeation Chromatograph (800 series manufacture by Nippon Bunko Co., Ltd.). The molecular weight was evaluated by a ratio (weight average molecular weight/number average molecular weight) of weight average molecular weight to number average molecular weight.

| Column: | Shodex A806M |
|---|---|

Measurement temperature: 45° C.,

Measurement solvent: Tetrahydrofuran

Measurement concentration : 0.5 mg/ml

The content of styrene in a copolymer (mol % of styrene contained in monomers constituting the copolymer) and the structure of the polymer such as a sequence of monomers were determined according to $^{13}$C-NMR analysis (JNM-EX270 manufactured by Nippon Denshi Co., Ltd.).

Measurement solvent: Ortho-dichlorobenzene

Measurement temperature: 135° C.

The hysteresis curve of a polymer was determined under conditions below with STROGRAPH-T (manufactured by Toyo Seiki Seisakusho Co., Ltd.).

Test piece: Press sheet of 120 mm×20 mm×0.3 mm
Tensile rate: 200 mm/min.
Tensile magnification: Double
Distance between chucks: 60 mm
Measurement temperature: 23° C.

The scratch resistance of a polymer was investigated under conditions below with a HEIDON surface tester, HEIDON-14.

Test piece: A sheet of 50 mm×50 mm×1 mm in size molded by hot-pressing at 180° C. for 3 minutes under a pressure of 30 to 50 kg/cm$^2$ after previously heating at 180° C. for 3 minutes.
Scratch load: 100 g or 500 g
Scratch rate: 75 mm/min. or 150 mm/min.
Needle size: 0.1 mm The refractive index of a polymer was investigated by measuring a test piece which was obtained by cutting into a size of 10 mm×30 mm a film of 100 μm thickness molded by carrying out hot-press at 180° C. for 3 minutes under a pressure of 30 to 50 kg/cm$^2$ after previously heating at 180° C. for 3 minutes, with Abbe refractometer, type 3 (manufactured by Atago Co., Ltd.).

The solid viscoelasticity of a polymer was determined under conditions below with a spectrometer(a tension module, DMS200 was connected to a measurement and analysis apparatus, Rheostation SDM5600H manufactured by Seiko Denshi industries, Ltd.)

Test piece : A pressed sheet of 20 mm×0.3 mm×0.3 mm
Frequency: 5 Hz
Heating rate : 2° C./minute
Displacement of vibration amplitude : 10 μm Example 1

After previously charging 40 ml of styrene and 3 ml of dry toluene into a 400 ml autoclave which had been replaced with argon, ethylene was charged under a pressure of 0.8 Mpa. After 4.0 ml(4 mmol) of toluene solution of triisobutylaluminum [manufactured by Toso-Akzo Co., Ltd., 1 mol/l] and a solution obtained by dissolving 6.0 mg (16 μmol) of isopropylidene(cyclopentadienyl)(3-tert-butyl-5-methyl-2-phenoxy)titanium dichloride in 8 ml of dry toluene were previously mixed, they were charged and successively, a solution obtained by dissolving 44.3 mg (48 μmol) of triphenylmethyltetrakis(pentafluorophenyl) borate in 9.6 ml of dry toluene was added. The reaction liquid was stirred at 60° C. for 1 hour. Then, the reaction liquid was poured in a mixture of 5 ml of hydrogen chloride (12N) and 1000 ml of methanol, and a white solid precipitated was collected by filtration. The solid was rinsed with methanol and then dried under reduced pressure to obtain 32.69 g of a polymer. The catalyst activity based on 1 mole of the titanium compound was 2043 kg/mol-Ti. The [η] of the polymer was 1.30 dl/g, number average molecular weight was 117,000, molecular weight distribution (weight average molecular weight/number average molecular weight) was 2.47, glass transition point was 26° C., and the content of styrene in the copolymer was 46 mol %.

The ratio of the area of the peak appearing at 34.0 to 36.0 ppm in a $^{13}$C-NMR spectrum to the area of the peak appearing at 36.0 to 38.0 ppm was 0.14.

Figure 2:
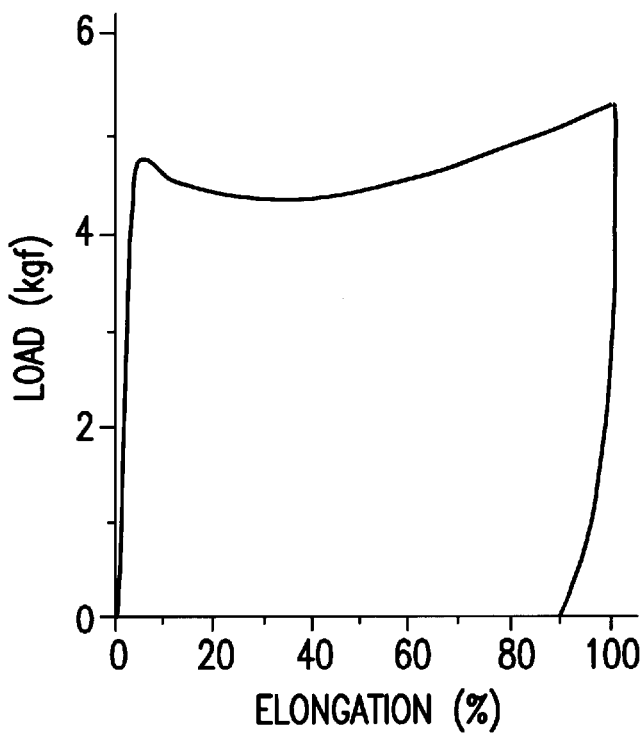
FIG. 2 shows a hysteresis curve of the polymer obtained in Example 1.

The hysteresis curve of the polymer obtained is shown in FIG. 2. When a test piece for measurement was stretched at a constant speed, whitening occurred at a time of reaching to a yield point, but the whitening disappeared in accordance with the return of stretching the test piece and it recovered about 100% to the condition before the measurement, finally.

Figure 4:
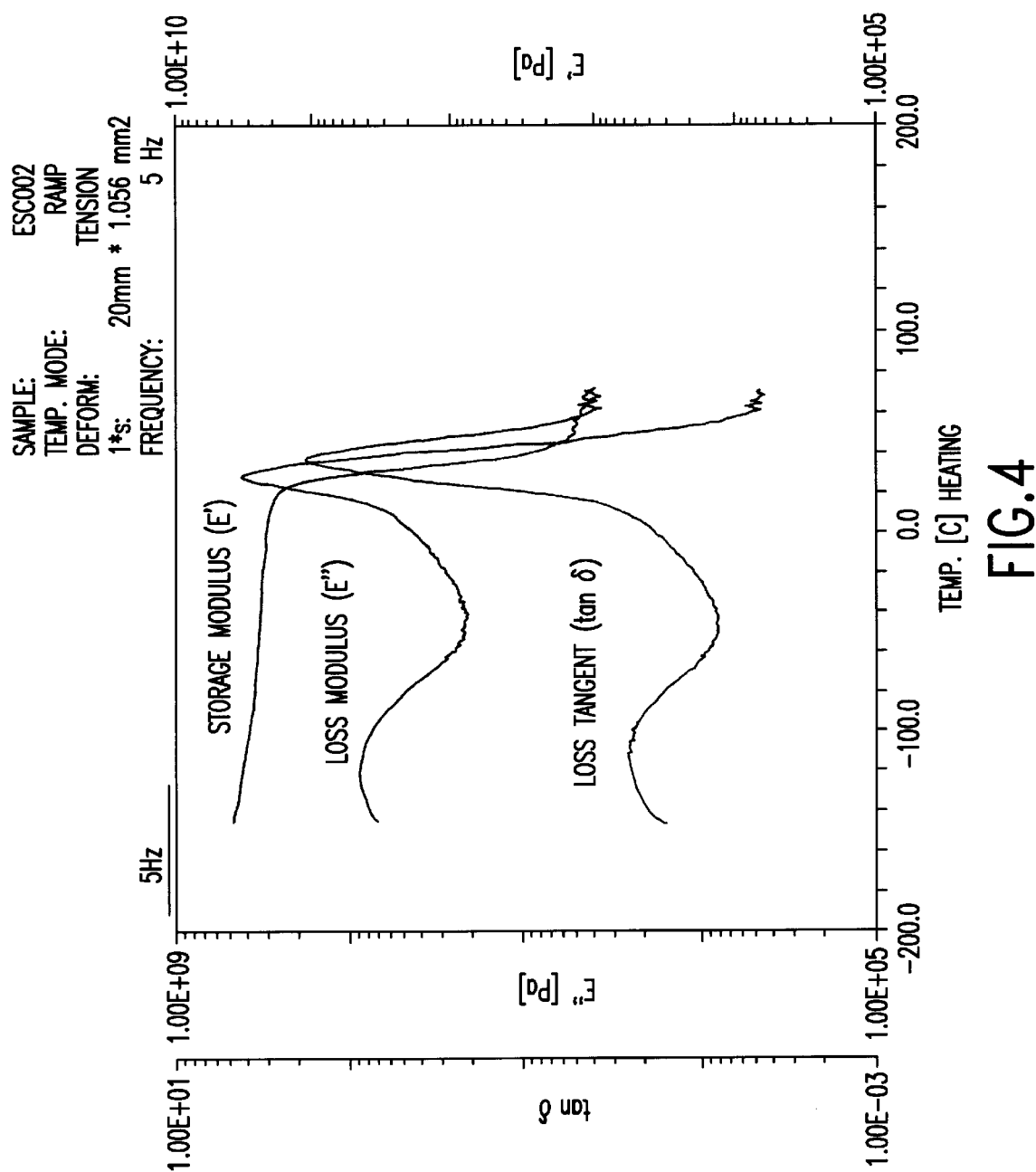
FIG. 4 shows a chart of the solid dynamic viscoelasticity of the copolymer obtained in Example 1.

The measurement result of a solid dynamic viscoelasticity is shown in FIG. 4. The maximum value of tan δ was 1.89. The press sheet used in this measurement is flexible, and when both ends of the sheet were set free after were caught and pulled, the elongation of the sheet was slowly recovered and it was restored about 100%.

Further, the press sheet prepared for the measurement had a very high transparency.

The refractive index of the film of the polymer obtained was 1.574.

Comparative Example 1

The same operation as in Example 1 was repeated except that isopropylidene(cyclopentadienyl)(3-tert-butyl-5-methyl-2-phenoxy)titanium dichloride in Example 1 was changed to (tert-butylamide)dimethyl (tetramethylcyclopentadienyl)silane titanium dichloride (16 μmol) synthesized according to the process described in Japanese Patent Publication (Kokai) Hei No.3-163088 and the pressure of ethylene was changed to 0.4 Mpa, to obtain 13.94 g of a polymer. The number average molecular weight of the polymer was 97,000, molecular weight distribution (weight average molecular weight/number average molecular weight) was 2.30, glass transition point was 25° C., and the content of styrene unit copolymerized was 44 mol %.

The ratio of the area of the peak appearing at 34.0 to 36.0 ppm in a $^{13}$C-NMR spectrum to the area of the peak appearing at 36.0 to 38.0 ppm was 0.35. The maximum value of tan δ was 1.45.

Example 2

The same operation as in Example 1 was repeated except that the amount of styrene previously charged in Example 1 was changed from 40 ml to 27 ml and the amount of dry toluene previously charged was changed from 3 ml to 68 ml, to obtain 20.96 g of a polymer. The catalyst activity based on 1 mole of the titanium compound was 1310 kg/mol-Ti. The [η] of the polymer was 1.38 dl/g, the number average molecular weight was 93,000, the molecular weight distribution (weight average molecular weight/number average molecular weight) was 2.92, the glass transition point was 17° C., melting point could not be substantially confirmed, and the content of styrene in the copolyme was 41 mol %.

The ratio of the area of the peak appearing at 34.0 to 36.0 ppm in a $^{13}$C-NMR spectrum to the area of the peak appearing at 36.0 to 38.0 ppm was 0.05.

Figure 3:
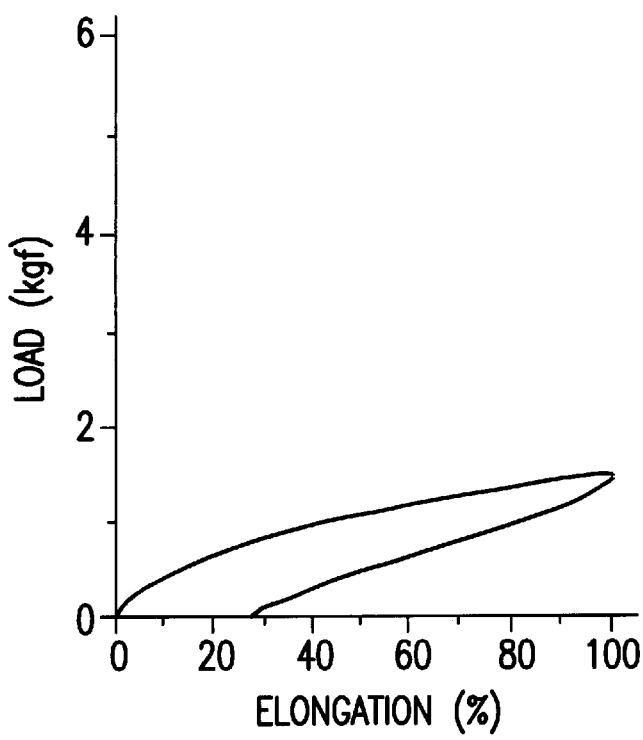
FIG. 3 shows a hysteresis curve of the polymer obtained in Example 2.

The hysteresis curve of the polymer obtained is shown in FIG. 3. A test piece for measurement stretched double recovered about 100% to the condition before the measurement, finally. The press sheet prepared for the measurement had a very high transparency.

Figure 5:
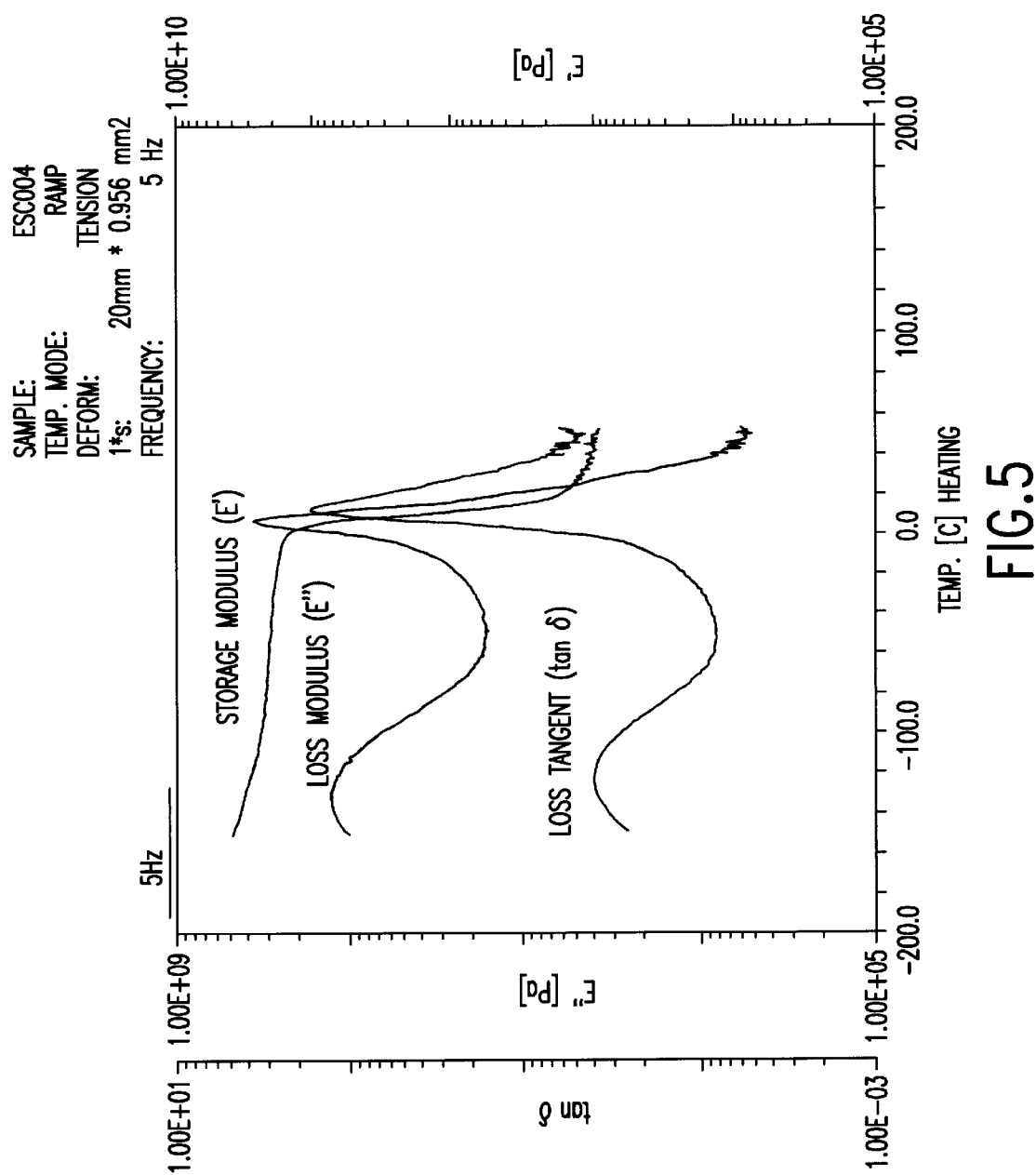
FIG. 5 shows a chart of the solid dynamic viscoelasticity of the copolymer obtained in Example 2.

The measurement results of dynamic elasticity are shown in FIG. 5. The maximum value of tan δ was 1.76. This press sheet used for measurement was flexible, and when the sheet was released after stretching both ends thereof, the sheet was slowly recovered and restored about 100% to the former form.

The refractive index of the film of the polymer obtained was 1.567.

The result of scratch resistance test of the polymer obtained is shown in Table 1.

TABLE 1

| Scratch rate mm/min. | Scratch load g | Depth of scratch (μm) Initial | Depth of scratch (μm) After 30 min. | Restoration rate % |
|---|---|---|---|---|
| 75 | 500 | 44.6 | 38.3 | 86 |
| 150 | 500 | 47.1 | 38.7 | 82 |
| 150 | 100 | 12.0 | 8.2 | 68 |

Example 3

Into a 100 ml autoclave replaced with argon, 15 ml of dry toluene, 1.0 ml(1 mmol) of toluene solution of triisobutylaluminum [manufactured by Toso-Akzo Co., Ltd., 1 mol/l], a solution obtained by dissolving 1. 5 mg (4 μmol) of isopropylidene(cyclopentadienyl)(3-tert-butyl-5-methyl-2-phenoxy)titanium dichloride in 1.5 ml of dry toluene, a solution obtained by dissolving 11.1 mg (12 μmol) of triphenylmethyltetrakis(pentafluorophenyl)borate in 2.4 ml of dry toluene, and 20 ml of styrene were added in order, and finally 2 kg/cm$^2$ of ethylene was charged. After the reaction liquid was stirred at 60° C. for 1 hour, the reaction liquid was poured in a mixture of 1 ml of hydrogen chloride (12N) and 300 ml of methanol, and a white solid precipitated was collected by filtration. The solid was rinsed with methanol and then dried under reduced pressure to obtain 1.89 g of a polymer. The catalyst activity based on 1 mole of the titanium compound was 472 kg/mol-Ti. The [η] of the polymer was 1.30 dl/g, the number average molecular weight was 236,000, the molecular weight distribution (weight average molecular weight/number average molecular weight) was 1.61, the glass transition point was 34° C., the melting point could not be substantially confirmed, and the content of styrene in the copolymer was 50 mol %.

The structure of the polymer was identified, referring to the analysis method according to $^{13}$C-NMR spectrum described in Makromol. Chem., Macromol. Symp. 66, 203–214 (1993), and as a result, it was found that the copolymer has the highly alternating tendency of arrangement of an ethylene unit with a styrene unit, and the polymer is a copolymer in which the stereoregularity of the styrene unit is substantially atactic.

Figure 6:
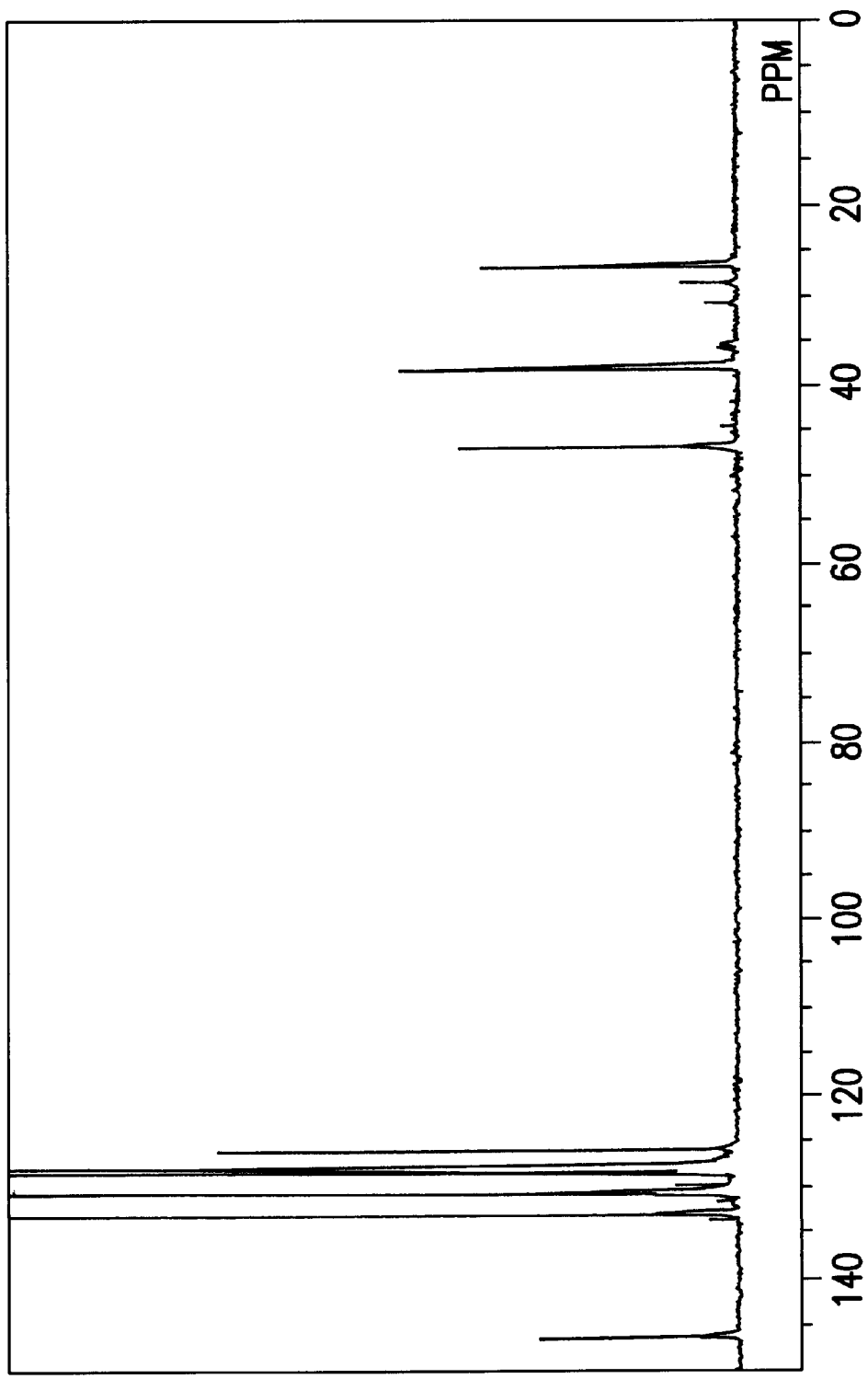
FIG. 6 shows a $^{13}C$-NMR spectrum of the polymer obtained in Example 3.

The $^{13}$C-NMR spectrum of the polymer obtained is shown in FIG. 6.

A signal corresponding to a carbon atom ($T_{\beta\delta}$) which was substituted with a benzene ring when two styrene units were sequentially bonded to the same direction, namely, a so-called head-to-tail bonding occurred, was observed at 44 ppm. Further, a signal corresponding to a carbon atom based on a methylene group indicated by $S_{\alpha\beta}$ was observed at 34 to 36 ppm, and a signal corresponding to a carbon atom based on a methylene group indicated by $S_{\alpha\gamma}$ or $S_{\alpha\delta}$ was observed at 36 to 38 ppm. The ratio of the area of a peak appearing at 34.0 to 36.0 ppm in the $^{13}$C-NMR spectrum to an area of the peak appearing at 36.0 to 38.0 ppm was 0.18.

Figure 7:
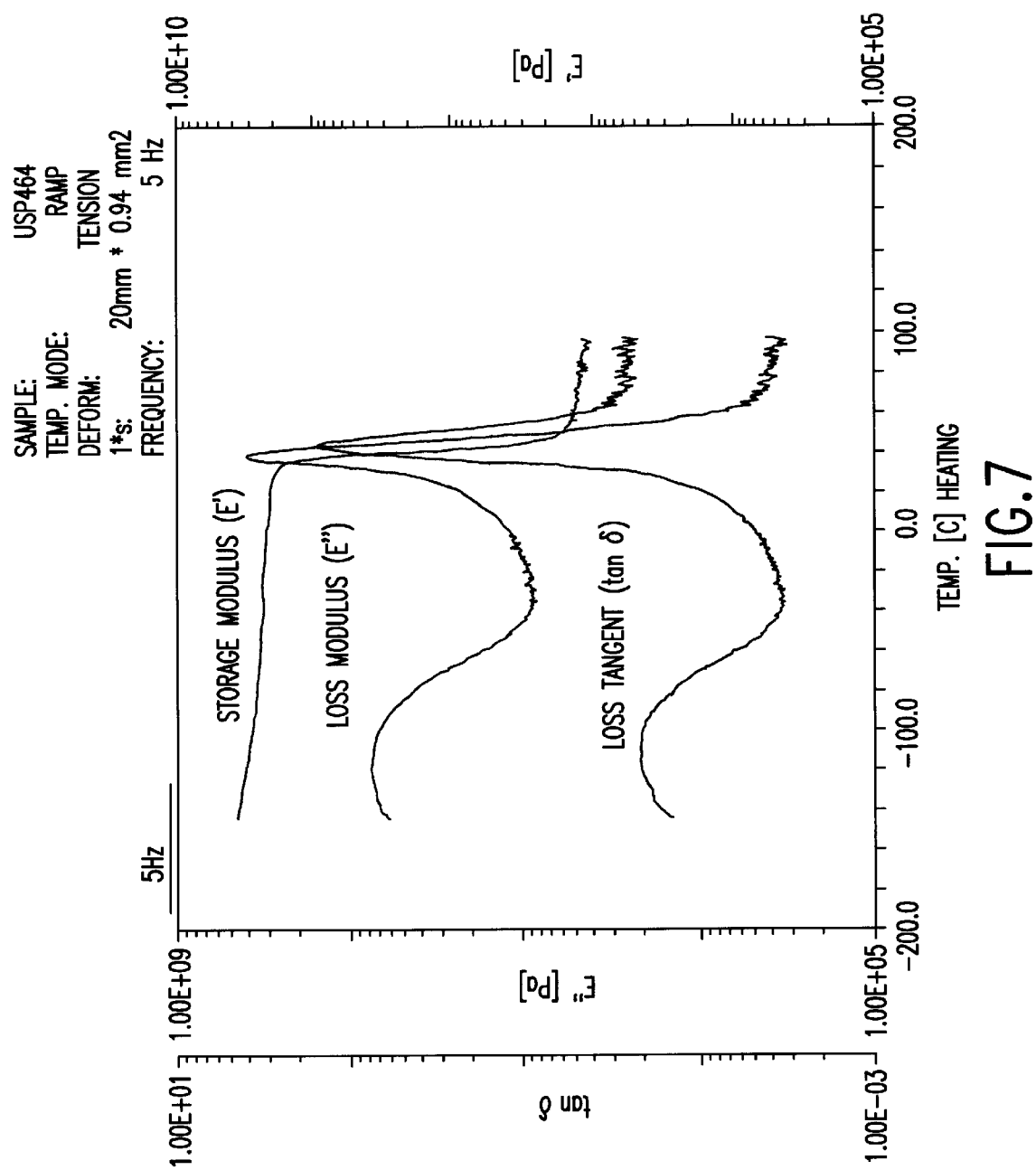
FIG. 7 shows a chart of the solid dynamic viscoelasticity of the copolymer obtained in Example 3.

The measurement result of the solid dynamic viscoelasticity us shown in FIG. 7. The maximum value of tan δ was 1.99. This press sheet used for measurement was flexible, and when the sheet was released after stretching both ends thereof, the elongation of the sheet was slowly recovered and restored about 100% to the former form.

Further, the film of the copolymer was transparent and had a refractive index of 1.581.

INDUSTRIAL APPLICABILITY

As illustrated in detail above, according to the present invention, a copolymer in which a sequence of ethylene with an alkenyl aromatic hydrocarbon was appropriately regulated, is provided, the copolymer is a copolymer of ethylene with an alkenyl aromatic hydrocarbon which is excellent in elastic recoverability, delay recoverability and vibration suppression performance, and is capable of taking a constitution in which halogen pointed out as a cause for environmental pollution is not contained. Further, in the present invention, the copolymer excellent in transparency, flexibility, scratch resistance and mechanical strength can be obtained, and is preferably suitable for use of a wrap film. Further, a process for producing the copolymer at an extremely high polymerization activity is provided according to the present invention and its industrial value is markedly great.

What is claimed is:

1. A copolymer of ethylene with an alkenyl aromatic hydrocarbon, wherein the content of the alkenyl aromatic hydrocarbon in the copolymer is 0.2 to 60 mol % and a ratio of an area of a peak ② appearing at 34.0 to 36.0 ppm in a $^{13}$C-NMR spectrum of the copolymer to an area of a peak ③ appearing at 36.0 to 38.0 ppm is 0.1 to 0.18.

2. The copolymer set forth in claim 1, wherein the copolymer has a structure in which carbon atoms substituted with an aromatic hydrocarbon group mutually separated by one methylene group, a structure in which carbon atoms substituted with an aromatic hydrocarbon group mutually separated by two methylene groups, and a structure in which carbon atoms substituted with an aromatic hydrocarbon group mutually separated three or more of methylene groups.

3. The copolymer set forth in claim 1, wherein the ratio ②/③ of the area is 0.01 to 0.14.

4. The copolymer set forth in claim 1, 2, or 3, wherein the molecular weight distribution (Mw/Mn) represented by a ratio of weight average molecular weight (Mw) to number average molecular weight (Mn) is 1.5 to 4.0.

5. The copolymer set forth in claim 1, 2, or 3, wherein the copolymer has an intrinsic viscosity [η] measured in tetralin as a solvent at 135° C. of 0.3 dl/g or more.

6. The copolymer set forth in claim 1, 2, or 3, wherein the relation of a maximum value X of a loss tangent(tan δ) with the content of the alkenyl aromatic hydrocarbon in the polymer S(mol %) satisfies the following expression(a'):

$$X > -0.0005 \times S^2 + 0.06 \times S + 0.04 \qquad (a').$$

7. The copolymer set forth in claim 1, 2, or 3, wherein the copolymer has no crystallinity.

8. A molded article comprising the copolymer set forth in claim 1, 2, or 3.

9. The molded article set forth in claim 8, wherein the molded article is a film or a sheet.

10. A process for the production of a copolymer of ethylene with an alkenyl aromatic hydrocarbon, wherein the content of the alkenyl aromatic hydrocarbon in the copolymer is 0.2 to 60 mol % and a ratio of an area of a peak ② appearing at 34.0 to 36.0 ppm in a $^{13}$C-NMR spectrum of the copolymer to an area of peak ③ appearing at 36.0 to 38.0 ppm is 0.01 to 0.35, wherein copolymerizing ethylene with the alkenyl aromatic hydrocarbon in the presence of a catalyst prepared by using (A) and {(B) and/or(C)} described below:

(A): a transition metal complex represented by the following general formula (I):

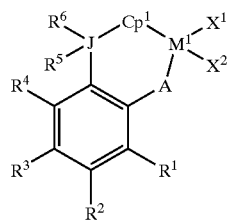

(I)

wherein M¹ is a transition metal atom of Group IV of the Periodic Table of the Elements;

A is an atom of the Group XVI of the Periodic Table of the Elements;

J is an atom of the Group XIV of the Periodic Table of the Elements;

Cp¹ is a group having a cyclopentadiene type anion skeleton;

each of $X^1$, $X^2$, $R^1$, $R^2$, $R^3$, $R^4$, $R^5$ and $R^6$ independently is a hydrogen atom, a halogen atom, an alkyl group, an aralkyl group, an aryl group, a substituted silyl group, an alkoxy group, an aralkyloxy group, an aryloxy group or a di-substituted amino group; and $R^1$, $R^2$, $R^3$, $R^4$, $R^5$ and $R^6$ may be optionally combined with each other to form a ring;

(B): one or more aluminum compounds selected from (B1), (B2), or (B3);

wherein (B1) is an organoaluminum compound represented by the general formula $E^1{}_a AlZ_{3-a}$;

(B2) is a cyclic aluminoxane having a structure represented by the general formula $\{-Al(E^2)-O-\}_b$, and (B3) is a linear aluminoxane having a structure represented by the general formula $E^3\{-Al(E^3)-O-\}_c AlE^3{}_2$, wherein $E^1$, $E^2$ and $E^3$ respectively represent a hydrocarbon group, all of $E^1$, all of $E^2$, and all of $E^3$ may be the same or different;

Z is a hydrogen atom or a halogen atom, and all of Z may be the same or different;

"a" represents a number satisfying the expression $0 < a \leq 3$;

"b" represents an integer of 2 or more; and

"c" represents an integer of 1 or more; and (C): a boron compound of any one of (C1), (C2) or (C3);

wherein (C1) is a boron compound represented by the general formula $BQ^1Q^2Q^3$, (C2) is a boron compound represented by the general formula $G^+(BQ^1Q^2Q^3Q^4)^-$, and (C3) is a boron compound represented by the general formula $(L-H)^+(BQ^1Q^2Q^3Q^4)^-$;

wherein B is a boron atom in the trivalent valence state;

$Q^1$ to $Q^4$ may be the same or different and each are respectively a halogen atom, a hydrocarbon group, a halogenated hydrocarbon group, a substituted silyl group, an alkoxy group or a di-substituted amino group;

$G^+$ is an inorganic or organic cation;

L is a neutral Lewis base; and (L-H)⁺ is a Brønsted acid.

11. The process according to claim 10, wherein the copolymer has a structure in which carbon atoms substituted with an aromatic hydrocarbon group mutually separated by one methylene group, a structure in which carbon atoms substituted with an aromatic hydrocarbon group mutually separated by two methylene groups, and a structure in which carbon atoms substituted with an aromatic hydrocarbon group mutually separated three or more of methylene groups.

12. The process according to claim 10, wherein the ratio ②/③ of the area is 0.1 to 0.25.

13. The process according to claim 10, wherein a molecular weight distribution (Mw/Mn) represented by a ratio of weight average molecular weight (Mw) to number average molecular weight (Mn) is 1.5 to 4.0.

14. The process according to claim 10, wherein the copolymer has an intrinsic viscosity [η] measured in tetralin as a solvent at 135° C. of 0.3 dl/g or more.

15. The process according to claim 10, wherein the relation of a maximum value X of a loss tangent (tan δ) with a content of alkenyl aromatic hydrocarbon in the copolymer S(mol %) satisfies the following expression (a'):

$$X > -0.0005 \times S^2 + 0.06 \times S + 0.04 \qquad (a').$$

16. The process according to claim 10, wherein the copolymer has no crystallinity.

17. The copolymer set forth in claim 4, wherein the copolymer has an intrinsic viscosity [η] measured in tetralin as a solvent at 135° C. of 0.3 dl/g or more.

18. The copolymer set forth in claim 4, wherein the relation of a maximum value X of a loss tangent (tan δ) with the content of the alkenyl aromatic hydrocarbon in the polymer S(mol %) satisfies the following expression(a'):

$$X > -0.0005 \times S^2 + 0.06 \times S + 0.04 \qquad (a').$$

19. The copolymer set forth in claim 4, wherein the copolymer has no crystallinity.

20. The copolymer set forth in claim 5, wherein the copolymer has no crystallinity.

21. The copolymer set forth in claim 6, wherein the copolymer has no crystallinity.

22. A molded article comprising the copolymer of claim 4.

23. A molded article comprising the copolymer of claim 5.

24. A molded article comprising the copolymer of claim 6.

25. A molded article comprising the copolymer of claim 7.

* * * * *